US012730230B2

(12) United States Patent
Greiff et al.

(10) Patent No.: US 12,730,230 B2
(45) Date of Patent: Sep. 8, 2026

(54) GNSS TRACKING USING CASCADED PROBABILISTIC ESTIMATORS

(71) Applicant: Mitsubishi Electric Research Laboratories, Inc., Cambridge, MA (US)

(72) Inventors: Marcus Greiff, Cambridge, MA (US); Karl Berntorp, Cambridge, MA (US); Stefano Di Cairano, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 275 days.

(21) Appl. No.: 18/584,559

(22) Filed: Feb. 22, 2024

(65) Prior Publication Data

US 2025/0271579 A1 Aug. 28, 2025

(51) Int. Cl.
*G01S 19/37* (2010.01)
*G01S 19/22* (2010.01)
*G01S 19/44* (2010.01)

(52) U.S. Cl.
CPC .............. *G01S 19/37* (2013.01); *G01S 19/22* (2013.01); *G01S 19/44* (2013.01)

(58) Field of Classification Search
CPC ........... G01S 19/37; G01S 19/22; G01S 19/44
See application file for complete search history.

(56) References Cited

U.S. PATENT DOCUMENTS 7,623,069 B2 * 11/2009 Mitsunaga .............. G01S 19/20 342/357.29
11,644,579 B2 * 5/2023 Berntorp ............... G01S 13/765 342/357.29
12,219,428 B2 * 2/2025 Zheng ................... G01S 19/396
2012/0299770 A1 * 11/2012 Lee ......................... G01S 19/20 342/357.67
2020/0132861 A1 4/2020 Kim et al.

OTHER PUBLICATIONS

Quoc-Huy Phan, Su-Lim Tan, Ian McLoughlin, Duc-Lung Vu, “A Unified Framework for GPS Code and Carrier-Phase Multipath Mitigation Using Support Vector Regression”, Advances in Artificial Neural Systems, vol. 2013, Article ID. 240564, 14 pages, 2013. https://doi.org/10.1155/2013/240564.

* cited by examiner

*Primary Examiner* — Cassi J Galt
(74) *Attorney, Agent, or Firm* — Gene Vinokur

(57) ABSTRACT

A state of a device is tracked based on transmissions from a global navigation satellite system (GNSS) by executing multiple probabilistic estimators concurrently tracking the state of the device using at least two measurement models of different size connecting the GNSS measurement data with the state of the device. One estimator tracks the state of the device based on a first measurement model using the code measurements. Another estimator tracks the state of the device based on a second measurement model using the GNSS measurement data masked by a binary mask blocking a subset of GNSS measurement data of a subset of the satellite signals based on values of coefficients of the binary mask. The number of measurements in the first measurement model is smaller than the number of measurements in the second measurement model.

19 Claims, 23 Drawing Sheets

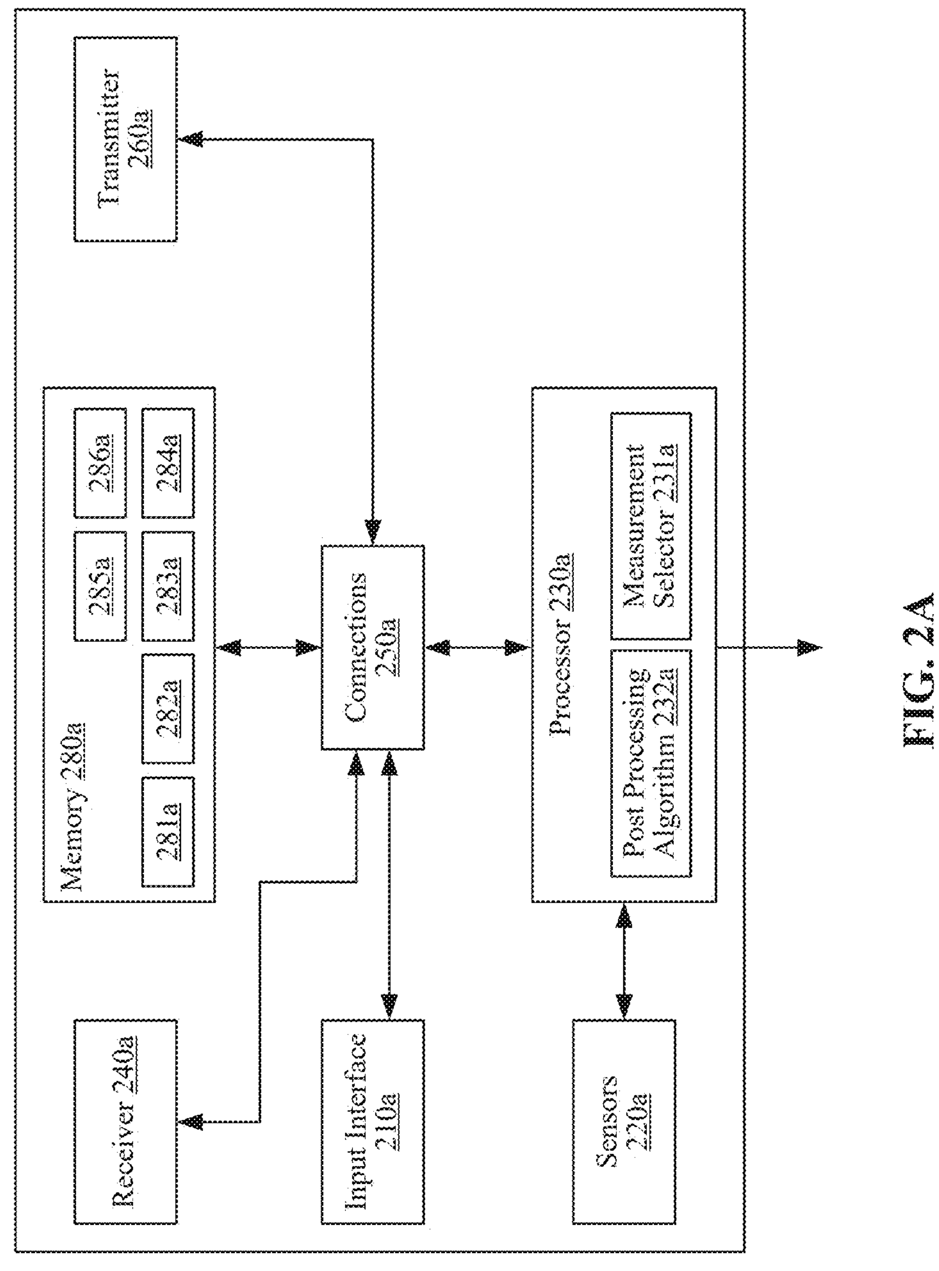
FIG. 2A
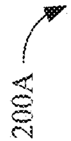

GNSS TRACKING USING CASCADED PROBABILISTIC ESTIMATORS

TECHNOLOGICAL FIELD

This invention relates generally to positioning systems, such as the global positioning system (GPS) or the Quasi-Zenith Satellite System (QZSS), and more particularly to the problem of determining if the measurements taken by a satellite receiver is affected by multi-path signals and modeling errors, using statistical methods to infer a mask that removes outlier measurements before estimating the position of the GNSS receiver.

BACKGROUND

A Global Navigation Satellite System (GNSS) is a system of satellites that can be used for determining the geographic location of a stationary or mobile receiver with respect to the earth. Examples of GNSS include GPS, Galileo, Glonass, QZSS, and BeiDou. Various global navigation satellite (GNS) correction systems are known that are configured for receiving GNSS signal data from the GNSS satellites, for processing these GNSS data, for calculating GNSS corrections from the GNSS data, and for providing these corrections to a receiver, with the purpose of achieving quicker and more accurate calculation of the mobile receiver's geographic position.

Various position estimation methods are known wherein the position calculations are based on repeated measurement of the so-called pseudo-range and carrier phase observables by Earth-based GNSS receivers. The "pseudo-range" or "code" observable represents a difference between the transmit time of a GNSS satellite signal and the local receive time of this satellite signal, and hence includes the geometric distance covered by the satellite's radio signals. The measurement of the alignment between the carrier wave of the received GNSS satellite signal and a copy of such a signal generated inside the receiver provides another source of information for determining the apparent distance between the satellite and the receiver. The corresponding observable is known as the "carrier phase," which is related to a third observable known as "doppler" measurement. The doppler measurement is the time-derivative of the carrier-phase signal. As such, doppler measurements can be used to infer the relative motion of the transmitting satellite and the receiver.

Any pseudo-range observation comprises inevitable error contributions, among which are receiver and transmitter clock errors, as well as additional delays caused by the non-zero refractivity of the atmosphere, instrumental delays, multipath effects, and detector noise. Any carrier phase observation additionally comprises an unknown integer number of signal cycles, that is, an integer number of wavelengths, that have elapsed before a lock-in to this signal alignment has been obtained. This number is known as the "carrier phase ambiguity." Usually, the observables are measured i.e., sampled by a receiver at discrete consecutive times. The index for the time at which an observable is measured is referred to as an "epoch." The known position determination methods commonly involve a dynamic numerical value estimation and correction scheme for the distances and error components, based on measurements for the observables sampled at consecutive epochs.

When GNSS signals are continuously tracked and no loss-of-lock occurs, the integer ambiguities resolved at the beginning of a tracking phase can be kept for the entire GNSS positioning span. The GNSS satellite signals, however, may be occasionally attenuated (e.g., due to buildings in "urban canyon" environments), or momentarily blocked (e.g., when the receiver passes under a bridge or through a tunnel). In such cases, the integer ambiguity values resulting from the signal processing in a delay-locked loop (DLL) are lost and must be re-determined. This process can take from a few seconds to several minutes. In fact, the presence of significant multi-path errors or unmodeled systemic biases in one or more measurements of either pseudo-range or carrier phase may make it difficult with present commercial positioning systems to resolve the ambiguities. As the receiver separation (i.e., the distance between a reference receiver and a mobile receiver whose position is being determined) increases, distance-dependent biases (e.g., orbit errors and ionospheric and tropospheric effects) grow, and, consequently, reliable ambiguity resolution (or re-initialization) becomes an even greater challenge. Furthermore, loss-of-lock can also occur in the DLLs due to a discontinuity in a receiver's continuous phase lock on a signal, which is referred to as a "cycle slip." For instance, cycle slips can be caused by a power loss, a failure of the receiver software, or a malfunctioning satellite oscillator. In addition, cycle slips can be caused by changing ionospheric conditions.

GNSS enhancement refers to techniques used to improve the accuracy of positioning information provided by the Global Positioning System or other global navigation satellite systems in general, a network of satellites used for navigation. For example, some methods use measurement differencing techniques based on takin the differences of signals from various satellites, differencing between receivers, differencing between epochs, and combination thereof. Single and double differences between satellites and the receivers reduce the error sources but do not eliminate them.

In some applications, multiple frequency bands are used. In the GPS constellation, this includes carrier frequencies of 1575.42 MHZ (the L1 band), 1227.6 MHZ (the L2 band), and 1176 MHz (the L5 band). Analogous to the differencing operations, the underlying radio physics can be used to combine several observations on multiple frequency bands to form ionosphere free combinations, further reducing the impact of ionospheric modeling errors on the position estimates.

However, it is understood that such methods of multi-path and error mitigation are not perfect, and that the quality of the measurements, i.e., if they are affected by multi-path and modeling errors, can be inferred from alternative sources of information. Some such information includes the satellite elevation angle, where a high elevation angle correlates with an absence of modeling errors and multi-path effects, and variations in expected signal-to-noise ratios (SNRs) or carrier-to-noise density measurements (CN). It is understood that prior art uses such signals to directly determine the presence or absence of multi-path effects using heuristic methods, removing outlier measurement accordingly, but that such methods do not have 100% detection accuracy. Thus, measurements that are corrupted by multi-path and modeling errors are sometimes included in the estimation problem, causing errors in determining the position of the receiver, sometimes referred to as the device.

To remedy this, it is desired to estimate the presence or absence of outliers induced by multi-path or other modeling errors in the measurements prior to solving the estimation problem. While it is possible to adapt the measurement noise in the probabilistic filters, such as the Kalman filter and its variants, to accommodate different outlier events, estimation of the measurement noise in real-time applications is computationally challenging and can lead to divergence of the probabilistic filter if poor modeling assumptions are made. This challenge is in part due to difficulties in analysis of statistical properties of the measurements and assumptions underlying the operation of the probabilistic filter.

Hence, there is a need for a probabilistic filtering framework and methods that can adapt to different measurement noises in a computationally efficient manner and estimate a measurement mask in a manner that includes the sampled measurements and auxiliary prior information such as SNR levels, CN levels, satellite elevations, and world geometries. This method is the subject of the present disclosure.

SUMMARY

Some embodiments are based on the realization that internal variables and/or calculations of a probabilistic filter, like a Kalman filter, can be used to evaluate the presence or absence of outliers in an estimation model. Specifically, a metric of evaluation of the correctness of the measurement model, for example, the likelihood of the measurement noise statistics, can be used correlate a current measurement indicative of a state of a device with a state predicted by a prediction model of the probabilistic filter.

In other embodiments, it is recognized that similar Kalman filtering techniques can be used to associate aggregate measurement likelihoods, hereinafter referred to as mode probabilities, with each estimation model in a larger set of estimation models. Thus, different assumptions of how multi-path affects the GNSS measurements can be assessed by estimating the likelihood that each of the models explains the measurement data.

However, such methods add significant computational burden to the over-all estimation problem, which makes them challenging to implement in a multi-satellite multi-constellation GNSS positioning problem and limiting their use. This motivates the implementation of a smaller, computationally efficient estimator, hereinafter referred to as "the first estimator", which primarily seeks to estimate a measurement mask that removes measurements that are likely affected by outliers such as multi-path or other modeling errors before including these measurements in a more complicated filter with a larger estimation model, hereinafter called "the second estimator".

For example, it is recognized that errors such as multi-path effects are geometric in nature, and likely to simultaneously affect carrier and code measurements. Thus, it is possible to formulate smaller estimation problems in which the carrier-phase measurements are not used to infer the state of the device, the mode probabilities, or the noise statistics, thus removing the integer ambiguities associated with these measurements from the estimation problem. In the following, this insight is used to formulate a smaller estimation problem, which computes a poor estimate of the position of the receiver but finds measurements that are corrupted by multi-path effects. This method is hereinafter referred to as "statistical measurement masking."

Different embodiments use different implementations of Bayesian probabilistic estimation. For example, some embodiments use Kalam filters or Kalman smoothers. Additionally or alternatively, in some embodiments use the filter or the smoother includes in an approximate Gaussian filter or smoothers using explicit, exact, or statistical linearization techniques to resolve nonlinearities of the estimation model.

In some embodiments, methods of addressing outliers cast the estimation problem in a smoothing setting, where data is received in batches and where the estimate at any given time can be computed not only from the cast and current measurements, but also the future measurements in the received batch of data. This differs from the filtering approaches, in which the current estimate is based on past and present data and computed in real time. The advantage of a smoothing solution is that it improves performance when compared to a filtering solution, at an increased computational cost. The state of the art includes algorithms based on Kalman smoothing in the Fraser-Potter (FP) or Rauch-Tung-Striebel (RTS) frameworks with a mean square error (MSE) error metric. Other smoothing methods include factor-graph optimization (FGO), which can additionally include robust loss functions such as Huber losses when solving the maximum a posteriori (MAP) estimation problems.

Smoothing is the problem of estimating an unknown probability density function of a state trajectory of the receiver or device considered over multiple time steps using past, present, and future measurements. A smoother is an algorithm that implements a solution to this problem, typically based on Bayesian techniques. For example, many types of Kalman smoothers use estimation models that include a prediction model subject to process noise and a measurement model subject to measurement noise.

In some embodiments, the first estimator is a filter that is used to estimate a sequence of measurement masks using statistical estimation techniques, which can be used with any of the above mentioned filtering methods, smoothing methods, or FGO methods, that are to solve the more complicated second estimation problem in which the integer ambiguities are resolved and estimated using the masked measurements.

In the following, it is understood that both the first and the second estimator tracks the state of the receiver as a function of the parameters of their respective estimation models. The present disclosure details several implementations of the first estimator, with the understanding that any Bayesian filter, smoother, or FGO method can be used to resolve the state estimate in the second estimator using the masked measurements which are computed in of the parameters of the first estimator.

To that end, in some implementations, a system jointly estimates states of GNSS receivers moving in a region using measurements of a Global Navigation Satellite System (GNSS). The system solves a first estimation problem to estimate a binary mask indicative of signals that are affected by modeling errors from sources such as multi-path. The first estimator operates on the code or pseudo-range measurements and solves the problem using Bayesian estimation methods such as variational inference of mixture methods. The output of the first estimator is used in the second estimator, which is a probabilistic filter or smoother that determines the state of the device using masked measurements, wherein measurements that are distorted by biases and modeling errors have been removed by applying the measurement mask. The state of the device is used to indicate changes in attributes, or to control the device using the state estimate from the second estimator.

Accordingly, one embodiment discloses a method for tracking a state of a device based on transmissions from a global navigation satellite system (GNSS), wherein the method is executed by a processor coupled with stored instructions implementing the method, wherein the stored instructions, when executed by the processor carry steps of the method, comprising: collecting GNSS measurement data of satellite signals transmitted from multiple satellites, wherein the GNSS measurement data include one or more of code measurements, carrier phase measurements and Doppler measurements of the satellite signals; executing multiple probabilistic estimators concurrently tracking the state of the device using at least two measurement models connecting the GNSS measurement data with the state of the device, wherein the multiple probabilistic estimators include a first estimator tracking the state of the device based on a first measurement model using the code measurements, and wherein the multiple probabilistic estimators include a second estimator tracking the state of the device based on a second measurement model using the code measurements and other GNSS measurement data masked by a binary mask blocking a subset of GNSS measurement data of a subset of the satellite signals based on values of coefficients of the binary mask, wherein the number of measurements in the first measurement model is smaller than the number of measurements in the second measurement model; determining the values of coefficients of the binary mask based on outputs of the first estimator; determining the state of the device based on outputs of the second estimator; and outputting the state of the device determined by the second estimator.

Another embodiment discloses a system for tracking a state of an object a device based on transmissions from a global navigation satellite system (GNSS), the system comprising a processor coupled with stored instructions, wherein the stored instructions, when executed by the processor cause the system to: collect GNSS measurement data of satellite signals transmitted from multiple satellites, wherein the GNSS measurement data include one or more of code measurements, carrier phase measurements, and doppler measurements of the satellite signals; execute multiple probabilistic estimators concurrently tracking the position state of the object device using different measurement models connecting the GNSS measurement data with the state of the device, wherein the multiple probabilistic estimators include a first estimator tracking the position state of the object device based on a first measurement model using the code measurements, and wherein the multiple probabilistic estimators include a second estimator tracking the state of the device based on a second measurement model using the GNSS measurement data, one or more of the code measurements, the phase measurements, and the doppler measurements, masked by a binary mask blocking a subset of the GNSS measurement data formed in a subset of the satellite signals based on values of coefficients of the binary mask, wherein the first measurement model is smaller than the second measurement model; determine the values of coefficients of the binary mask based on outputs of the first estimator; determine the state of the device based on outputs of the second estimator; and output the state of the device determined by the second estimator.

Yet another embodiment discloses a non-transitory computer-readable storage medium embodied thereon a program executable by a processor for performing a method for estimating movement of a device based on a state of the device tracked using transmissions from a global navigation satellite system (GNSS), the method comprising: collecting GNSS measurement data of satellite signals transmitted from multiple satellites, wherein the GNSS measurement data include one or more of code measurements, and carrier phase measurements of the satellite signals; executing multiple probabilistic estimators concurrently tracking the position state of the object device using different measurement models connecting the GNSS measurement data with the state of the device, wherein the multiple probabilistic estimators include a first estimator tracking the position state of the object device based on a first measurement model using the code measurements, and wherein the multiple probabilistic estimators include a second estimator tracking the state of the device based on a second measurement model using the GNSS measurement data, one or more of the code measurements, the phase measurements, and the doppler measurements, masked by a binary mask blocking a subset of the GNSS measurement formed in a subset of the satellite signals based on values of coefficients of the binary mask, wherein the first measurement model is smaller than the second measurement model; determining the values of coefficients of the binary mask based on outputs of the first estimator; determining the state of the device based on outputs of the second estimator; and outputting the state of the device determined by the second estimator.

BRIEF DESCRIPTION OF THE DRAWINGS

FIG. 2A shows a block diagram of a system for tracking a state of a receiver of a GNSS according to some embodiments.

DETAILED DESCRIPTION

Figure 1A:
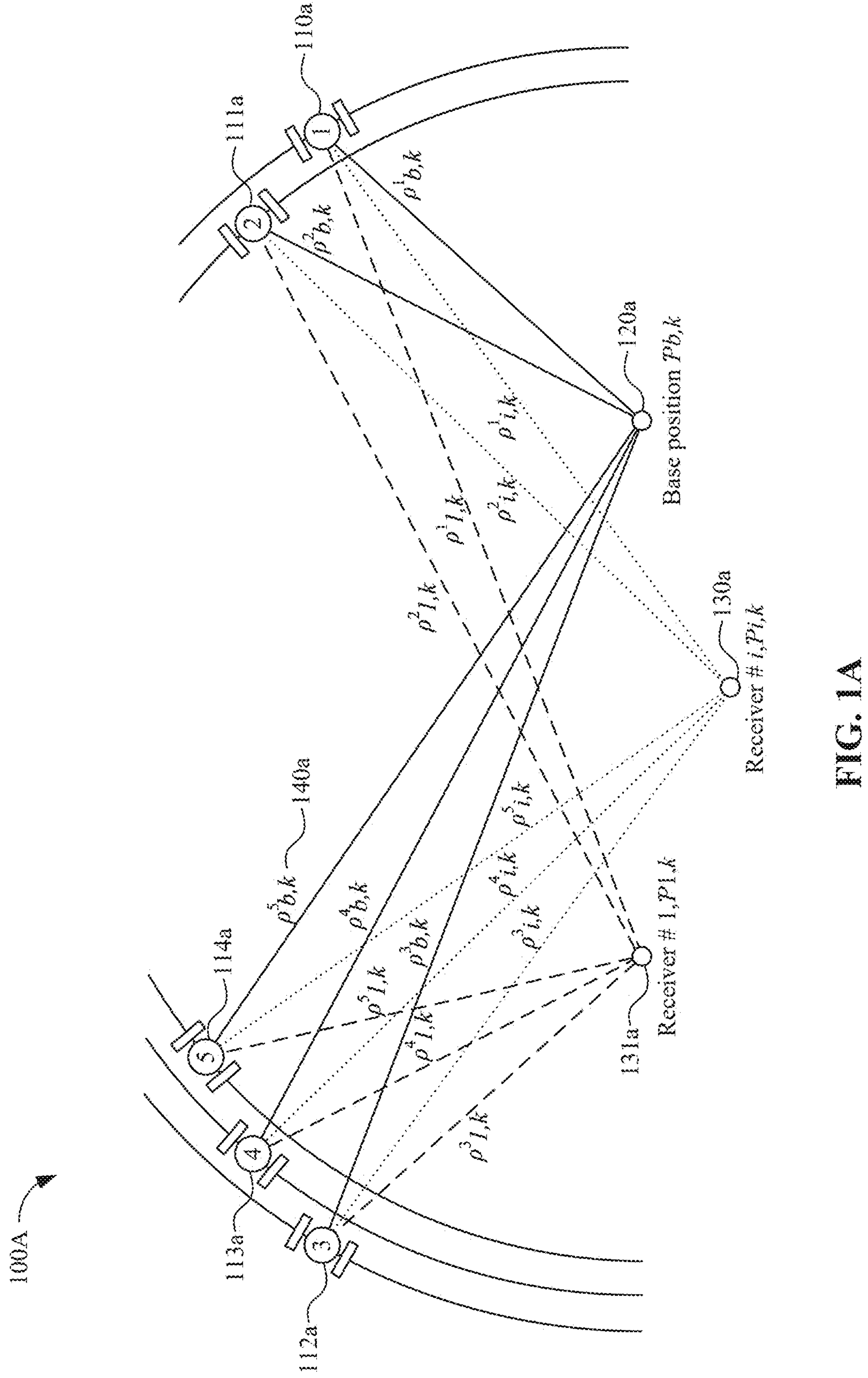
FIG. 1A shows a schematic of a global navigation satellite system (GNSS) with several receivers and a base station, according to some embodiments.

FIG. 1A illustrates the geometry of a Global Satellite Navigation System (GNSS) according to some embodiments. The receivers 130*a* and 131*a* receive radio signals which are processed in the GNSS receiver to yield pseudo-range, carrier-phase and doppler measurements, along with other signals indicative of the quality of the radio communication and satellite health. These measurements relate to the geometric range 140*a* and its time derivative, but also includes a set of biases that need to be modeled or estimated. In some embodiments, the measurements taken in receivers 130*a* and 131*a* are combined with measurements taken by a known base station in 120*a* to attenuate sources of error. One such set of pseudo-range, carrier-phase and doppler measurements are received per satellite seen by the receiver on each epoch and processed locally in the receiver. In FIG. 1A, the set of visible satellites is illustrated 110*a*-114*a*, but some embodiments utilize a much larger number of satellites from many different constellations, including, but not limited to, the GPS, Galileo, Glonass, QZSS, and BeiDou constellations. Some embodiments use one or multiple carrier frequency bands per satellite.

In various embodiments, the GNSS receivers 120*a*, 130*a*, and 131*a* may differ. For example, in the embodiment depicted in FIG. 1A, receiver 120*a* is a base receiver, whose position is known and can be mounted on the ground. In contrast, receivers 130*a* and 131*a* can be either mobile and assumed to be in motion or stationary receivers, but in either case, their positions and motions are unknown. For instance, the receivers 130*a* and 131*a* can be mounted on a cell phone, a car, an aquatic buoy, or a tablet. A reliever mounted on such an object is referred to as a "device." In all described embodiments, there are multiple GNSS receivers receiving code, carrier phase and doppler signals, and the number of receivers is large. In some embodiments, the base station 120*a* is moving, and in yet other embodiments, the base station does not have a known position.

Figure 1B:
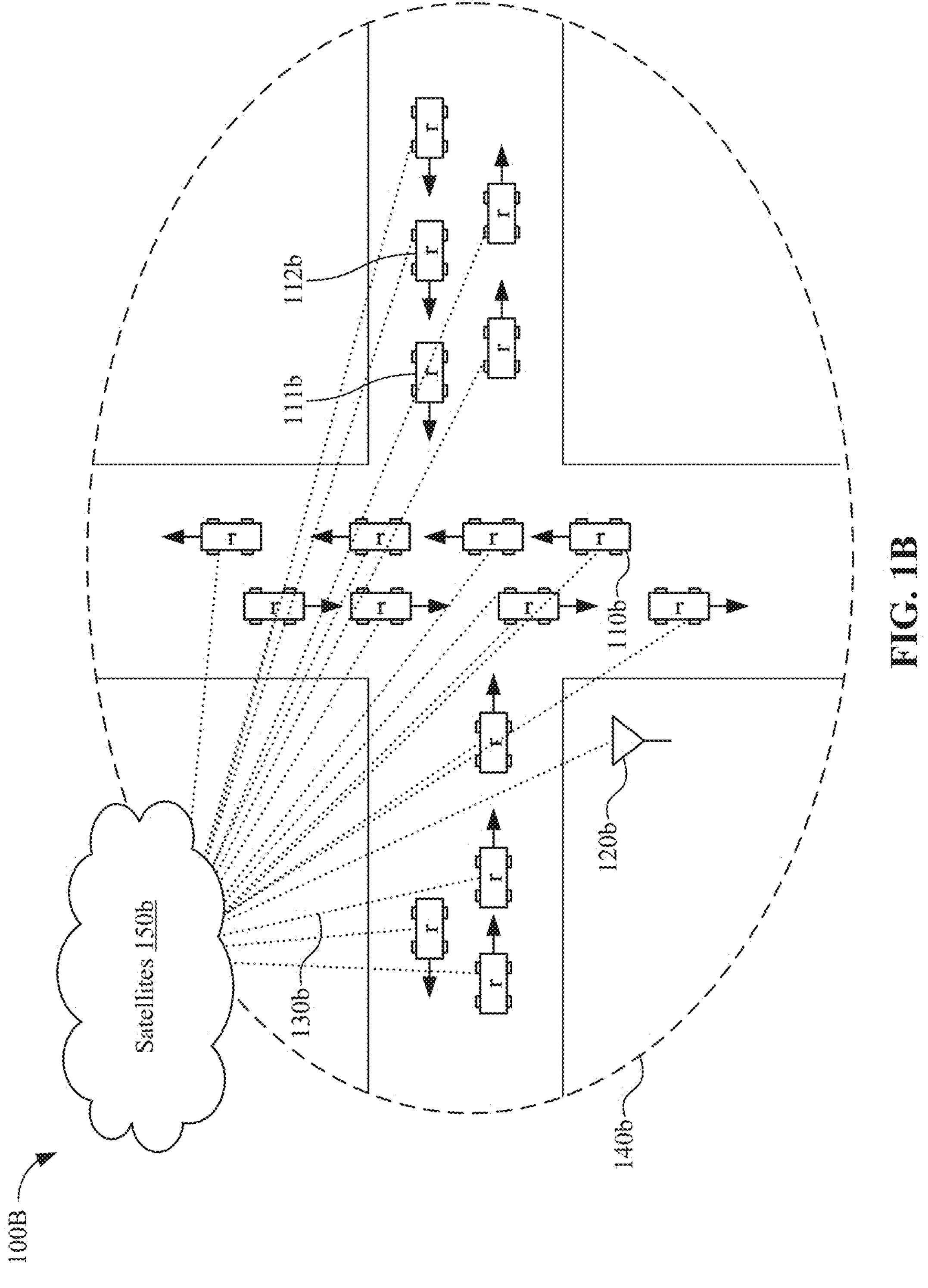
FIG. 1B depicts an urban driving scenario in which the masking method is used to improve the position estimate of one or more receivers mounted to vehicles.

FIG. 1B illustrates a scenario with an intersection where a base station 120*b* is included in the GNSS positioning, and the objective is to accurately reconstruct the trajectories of a large number of vehicles in an intersection. In some embodiments, the base station is a part of a roadside unit (RSU) which may optionally be used to control the intersection. In this example, several GNSS receivers are attached to vehicles 111*b*-112*b* in a four-way crossing 140*b*, the base station 120*b* is located nearby, and the vehicles' positions are estimated in a region near the intersection 140*b*. The GNSS measurements are determined from the radio communication 130*b* between the satellites 150*b* and the receivers 111*b*-112*b*. Due to the proximity of the receivers, and the use of the same base station 120*b* and same set of satellites 150*b*, there exist correlations between the measurements which gives rise to correlated state estimates and disturbances. As such, it is possible that multipath detected in one satellite signal from the vehicle 111*b* may increase the likelihood that the vehicle 112*b* will experience similar disturbances a short while later when in the approximate position of 111*b*. This is due to multipath being in part a geometric phenomenon, which depends on the relative location of the receiver and satellite and any obstructing building or trees that appear between the receiver and satellite.

Figure 1C:
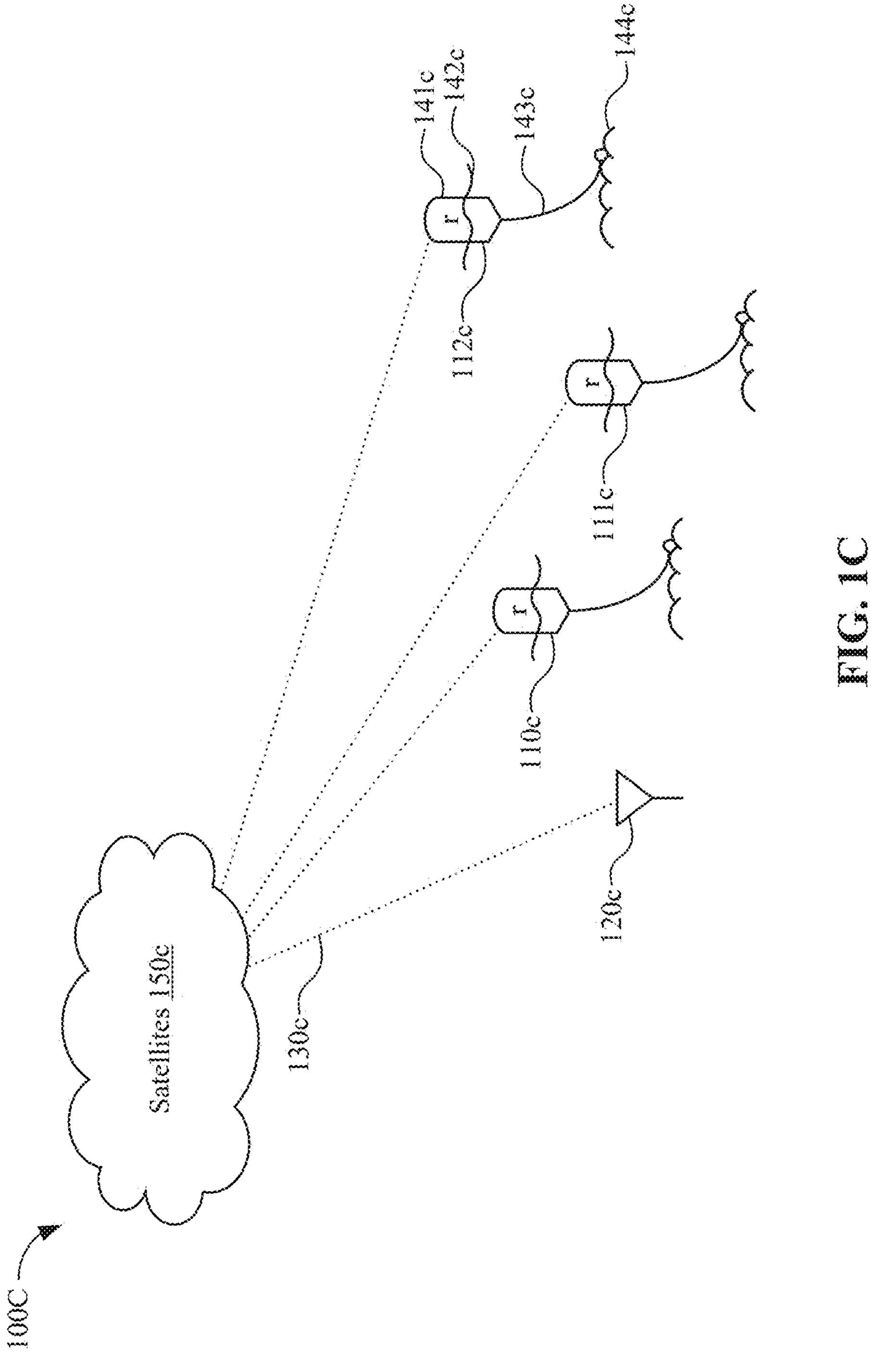
FIG. 1C shows an aquatic monitoring scenario where the masking method is used to improve the position estimate of receivers mounted to buoys.

FIG. 1C depicts a scenario relating to environmental monitoring, where the positions of a set of aquatic surface buoys 110*c*-112*c* are to be estimated. The buoys are equipped with antenna 141*c* which is above the water level 142*c*, and in some embodiments, the buoys are attached to the ocean floor 144*c* with a mooring chain 143*c*. In the example, there is a base station 120*c* which communicates with the satellites 150*c* using radio communication 130*c*.

In some embodiments, these buoys 110*c*-112*c* are placed in water reservoirs and lakes, and in other embodiments, the buoys 110*c*-112*c* are placed in the ocean. In the former example, the buoys monitor changes in water levels over long time scales, where sudden changes due to rain or irrigation events imply that the dynamics of the buoy may differ in time. In the latter example of monitoring land-based reservoirs, reflections in trees and the water may give rise to extended periods of multi-path disturbance. In the case of oceanic monitoring, the waves may give rise to unpredictable reflections which can cause multipath effects even when there is a clear line of sight between the antenna and the satellite.

Figure 1D:
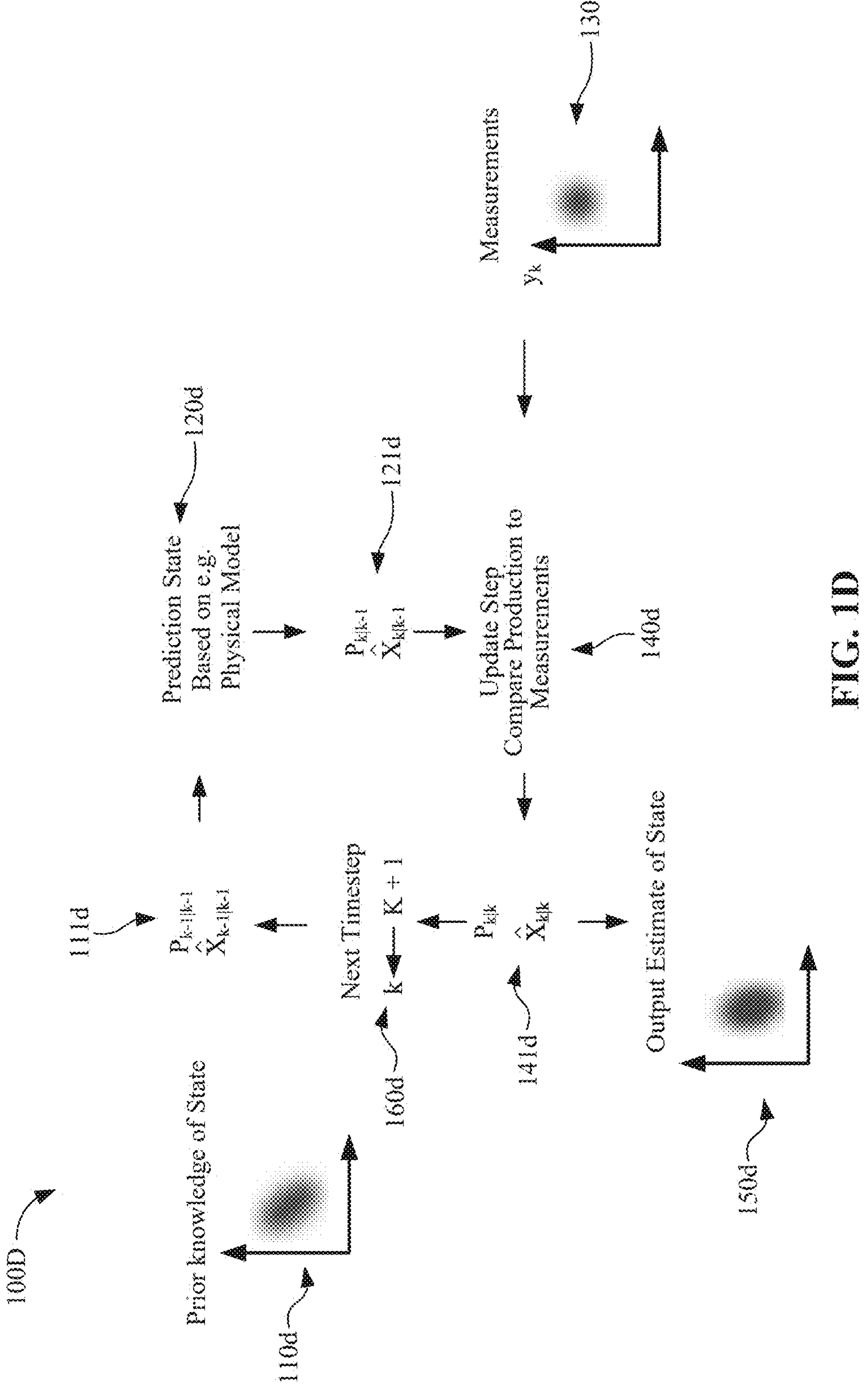
FIG. 1D shows a schematic of the Kalman filter (KF), as used in some embodiments of the invention.

FIG. 1D shows a schematic of the Kalman filter (KF) used by some embodiments for state estimation. The KF is a tool for state estimation in linear state-space models, $$x_{k+1} = A_k x_k + q_k$$

$$y_k = C_k x_k + r_k$$

Where the measurement noise is Gaussian distributed $$q_k \sim N(0, Q_k)$$

$$r_k \sim N(0, R_k)$$

and it is the optimal estimator when the noise and the prior estimate are Gaussian, in which case also the state estimate is Gaussian distributed. The KF estimates the mean and variance of the Gaussian distribution because these are the two required quantities, sufficient statistics, to describe the Gaussian distribution.

The KF starts with an initial knowledge 110*d* also known as a prior, to determine a mean of the state and its variance 111*d*. The KF then predicts 120*d* the state and the variance to the next time step, using a model of the system, to obtain an updated mean and variance 121*d* of the state. The KF then uses a measurement 130*d* in an update step 140*d* using the measurement model of the system, to determine an updated mean and variance 141*d* of the state. An output 150*d* is then obtained, and the procedure is repeated for the next time step 160*d*. The update equations of the linear KF given the above estimation model is as follows $$m_{k|k-1} = A_{k-1}m_{k-1}$$

$$P_{k|k-1} = A_{k-1}P_{k-1}(A_{k-1})^T + Q_k$$

$$K_k = P_{k|k-1}(C_k)^T\left(C_kP_{k|k-1}(C_k)^T + R_k\right)^{-1}$$

$$m_k = m_{k|k-1} + K_k\left(y_k - C_km_{k|k-1}\right)$$

$$P_k = (I - K_kC_k)P_{k|k-1}$$

where the marginal filtering posterior at a time k is $$p(x_k \mid y_{0:k}) = N(x_k; m_k, P_k)$$

In some embodiments, the state estimator uses the carrier phase single difference (SD) and/or double difference (DD) for estimating a state of the receiver, wherein the state includes a position of the receiver. When a carrier signal transmitted from one satellite is received by two receivers the difference between the first carrier phase and the second carrier phase is referred as the single difference (SD) in carrier phase. Alternatively, the SD can be defined as the difference between signals from two satellites reaching a receiver, wherein the first satellite is called the base satellite. For example, the difference between signal from satellite 110*a* and signal from satellite 111*a* is one SD signal, where satellite 110*a* is the base satellite. Using pairs of receivers, 120*a* and 130*a* in FIG. 1A, the difference between SDs in carrier phase obtained from the radio signals from the two satellites is called the double difference (DD) in carrier phase. When the carrier phase difference is converted into the number of wave lengths, for example, $\lambda_1 \approx 0.1905$ m for L1 GPS (and/or GNSS) signal, it is separated by fractional and integer parts. The fractional part can be measured by the positioning apparatus, whereas the positioning device is not able to measure the integer part directly. Thus, the integer part is referred to as integer bias or integer ambiguity.

In other embodiments, it is recognized that combining measurements on different frequency bands can be done in such a way as to eliminate certain biases from the estimation problem. One such example is ionosphere-free (IF) multi-band (MB) combinations, in which undifferenced, single differenced, or double differenced measurements are taken in a linear combination over at least two different frequency bands, using a fraction of each proportional to the ratio of the carrier frequencies squared. It is recognized that this, if done appropriately, eliminates the ionospheric delays from the estimation problem.

In general, a GNSS can use multiple constellations at the same time to determine the receiver state. For example, GPS, Galileo, Glonass, and QZSS can be used concurrently. Satellite systems typically transmit information on up to three different frequency bands, and for each frequency band, each satellite transmits a code measurement and a carrier-phase measurement. These measurements can be combined as either single differenced or double differenced, wherein a single difference includes taking the difference between a reference satellite and other satellites, and wherein double differencing includes differencing also between the receiver of interest and a base receiver with known static location.

Figure 1E:
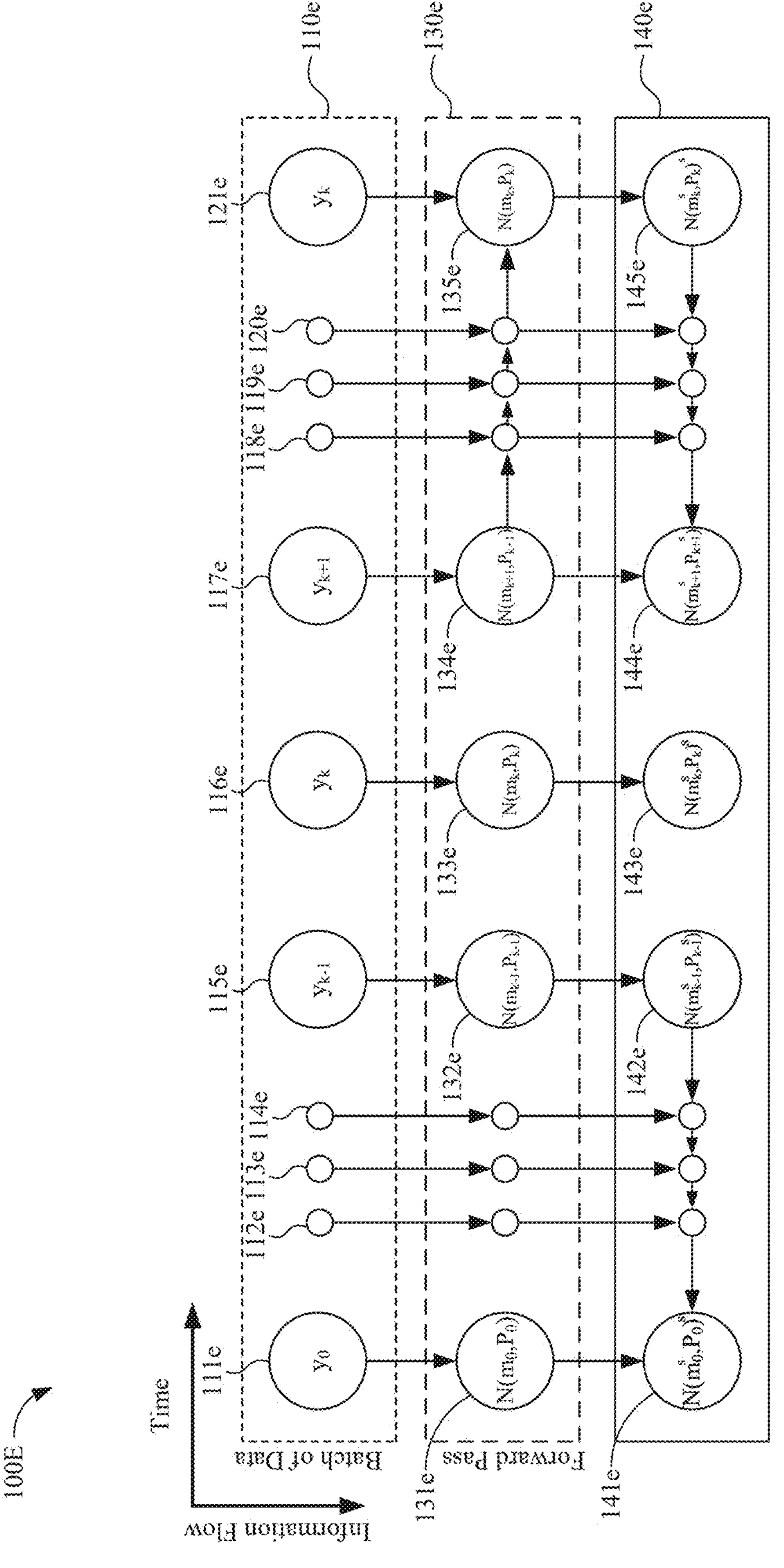
FIG. 1E shows a schematic of the Kalman filter (KF) with respect to a batch of measurement data and its extension to smoothing, used by some embodiments for state estimation.

FIG. 1E shows a schematic of the information flow in a Kalman filter 130*e*, as depicted in FIG. 1D, run on a batch of data 110*e* containing several measurements 111*e*, 112*e*, 113*e*, 114*e*, 115*e*, 116*e*, 117*e*, 118*e*, 119*e*, 120*e*, 121*e*. This Kalman filter is referred to as a forward pass 130*e*, and can be complemented by a backward pass 140*e*, in which the filtering posterior 131*e*, 132*e*, 133*e*, 134*e*, 135*e* is corrected by future measurements in the batch to generate a smoothing posterior 141*e*, 142*e*, 143*e*, 144*e*, 145*e*. It is recognized that, if possible, this generates more informative and accurate estimates in the linear Gaussian setting. Implementing the smoother like in FIG. 1E is called a Rauch-Tung-Striebel (RTS) smoother, signified by a forward pass stored in memory and then corrected by a backward pass. It is recognized that there are alternative smoothing schemes, such as Fraser-Potter (FP) smoothers, which run a forward and a backward pass in parallel, storing both in memory, before subsequently combining the two estimates into a third estimate which constitutes the smoothing posterior. It is recognized that both RTS and FP smoothers produce identical results in the linear Gaussian setting, and some embodiments use either RTS smoothers, or FP smoothers, or both. In the case of the backward pass of the RTS, the exact correction equations are $$G_k^s = P_k(A_k)^T\left(P_{k+1|k}\right)^{-1}$$

$$m_k^s = m_k + G_k^s\left(m_{k+1}^s - m_{k+1|k}\right)$$

$$P_k^s = P_k + G_k^s\left(P_{k+1}^s - P_{k+1|k}\right)$$

Where the smoothing posterior at a time k is $$p(x_k \mid y_{0:K}) = N(x_k; m_k^s, P_k^s)$$

It is recognized that some relationships in the estimation model, such as the geometric ranges, are nonlinear functions of the state (position, velocity, biases) of the receiver. In this case, the measurement model is nonlinear. In this case, some embodiments leverage first order approximations of the nonlinearities to generate locally linear models that are used in the RTS or FP smoothing frameworks, while other embodiments use partially linear moment matching techniques to approximate the distribution of a random variable passed through a partially linear function. For example, in the latter case, the integrals $$m_{k|k-1}^y = \int h(x_k)N\left(x_k; m_{k|k-1}, P_{k|k-1}\right)dx_k$$

$$P_{k|k-1}^{xy} = \int \left[x_k - m_{k|k-1}\right]\left[h(x_k) - m_{k|k-1}^y\right]^T N\left(x_k; m_{k|k-1}, P_{k|k-1}\right)dx_k$$

$$P_{k|k-1}^{yy} = \int \left[h(x_k) - m_{k|k-1}^y\right]\left[h(x_k) - m_{k|k-1}^y\right]^T N\left(x_k; m_{k|k-1}, P_{k|k-1}\right)dx_k + R_k$$

are evaluated by means of cubature rules, over the part of the measurement model that is nonlinear in the states of the estimation model, resulting in the update $$K_k = P_{k|k-1}^{xy}\left(P_{k|k-1}^{yy}\right)^{-1}$$

-continued $$m_k = m_{k|k-1} + K_k\left(y_k - m^y_{k|k-1}\right)$$

$$P_k = P_{k|k-1} - K_k\left(P^{xy}_{k|k-1}\right)^{-1}$$

in the computations of the filtering posterior. It is recognized that for linear prediction models, the smoothing corrections remain the same as in the linear setting and do not require computationally costly evaluations of moment integrals.

Figure 1F:
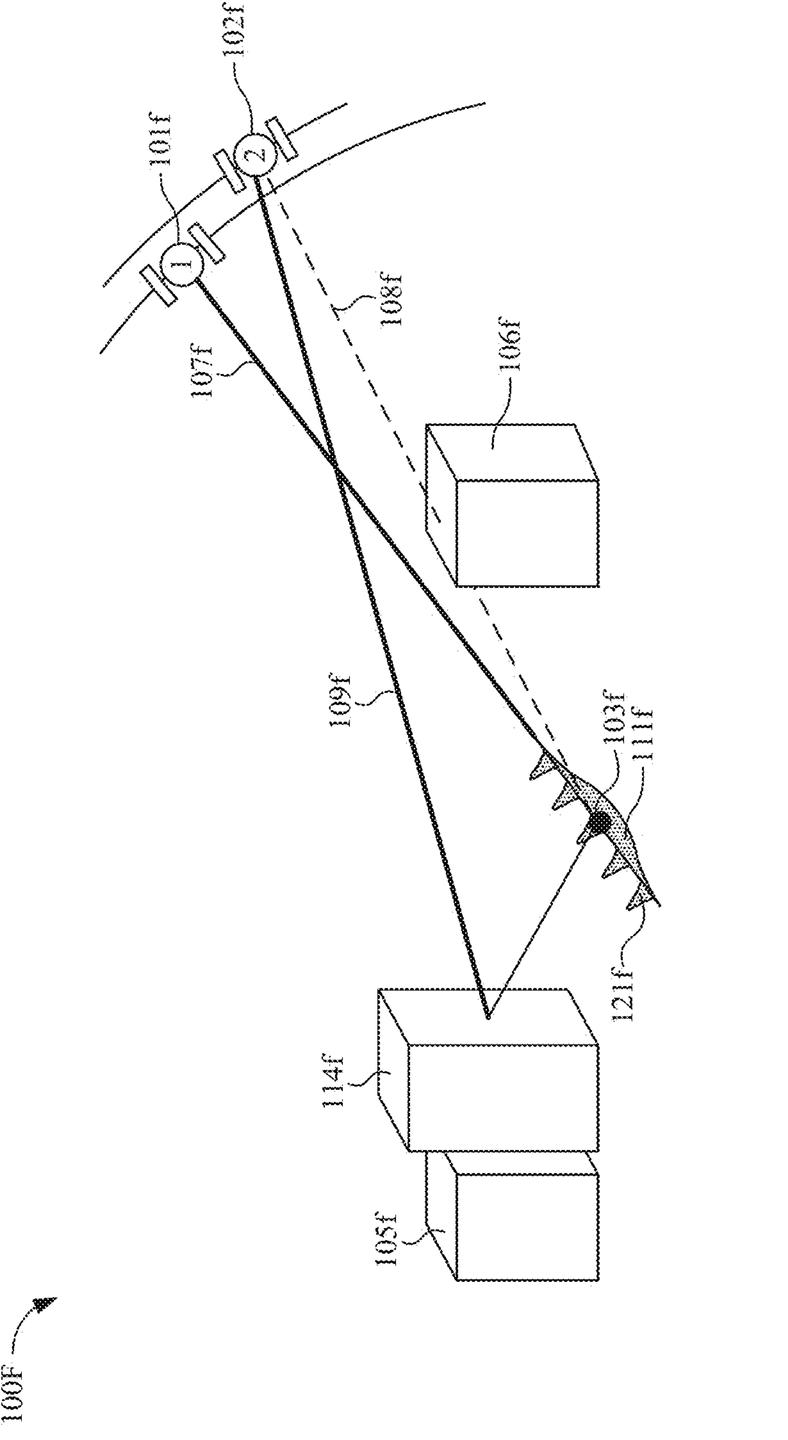
FIG. 1F exemplifies how multi-path effects occur due to reflections of the satellite signals in the buildings of an urban canyon.

FIG. 1F describes a scenario where multi-path is induced in a GNSS measurement due to a reflection in a building, resulting in modeling errors which worsens the estimates of the position of the receiver. In this example, a receiver 103*f* is communicating with two satellites 101*f*, 102*f*, registering pseudo-range 111*f* and carrier phase 112*f* measurements. The measurement likelihoods of these signals 111*f* and 112*f* are depicted, and it is understood that the pseudo-range measurement likelihood is associated with a larger variance 111*f*, while the carrier-phase measurement likelihood has several modes separated by a multiple of the carrier wavelength associated with the GNSS communication 112*f*. For example, in the GPS constellation, the carrier wavelength on the L1 band is approximately 19.05 cm. The example contains three buildings 104*f*, 105*f*, 106*f*, and the signals from satellite 102*f* is reflected in the building 104*f*. Thus, the receiver is expecting the measurement to correspond to the line-of-sight distances 107*f*, 108*f*, but the actual distance 109*f* measured from satellite 102*f* is much longer, due to the reflection. This modeling error causes significant positioning errors when computing the location of the position based on the GNSS measurement information, and it is an objective of the invention to detect when such modeling errors are present.

The act of determining which of the measurements that are corrupted by multi-path effects or other modeling errors is hereinafter referred to as determining a measurement mask, and the application of this determined measurement mask to remove measurements that are poor in quality is referred to as measurement masking. Before disclosing how this masking is conducted, we first describe how the carrier-phase and pseudo-range measurements, among other measurements such as doppler shifts, are related to the states of the receiver. To this end, we introduce two separate estimation models. The first is referred to as the large estimation model, which is used in filtering and smoothing applications. The second is referred to as the small estimation model, which can be used to estimate the quality of the measurements.

It is understood that the pseudo-range measurement, sometimes also known as a code measurement, can be evaluated in a receiver using technology such as delay-locked loops (DLLs) on one or more frequency bands from the same satellite. It is also understood that as a part of this processing, it is possible to determine a carrier phase measurement which corresponds to the range of the satellite modulo the carrier wavelength, which may differ between different constellations and where each satellite in a constellation may communicate on one or more frequency bands. For example, the GPS constellation communicates on three main frequency bands, referred to as the L1, L2, and L5 bands. It is also understood that, but the problem geometry, multi-path that affects a pseudo-range measurement is also likely to affect the corresponding carrier-phase measurements and similarly deteriorate the doppler information. As such, it is recognized that one may develop algorithms that focus on multi-path detection in the pseudo-range measurements, computing a measurement mask based on such signals, and determine which pseudo-range, carrier phase and doppler measurements that should be included in the estimation problem.

Figure 1G:
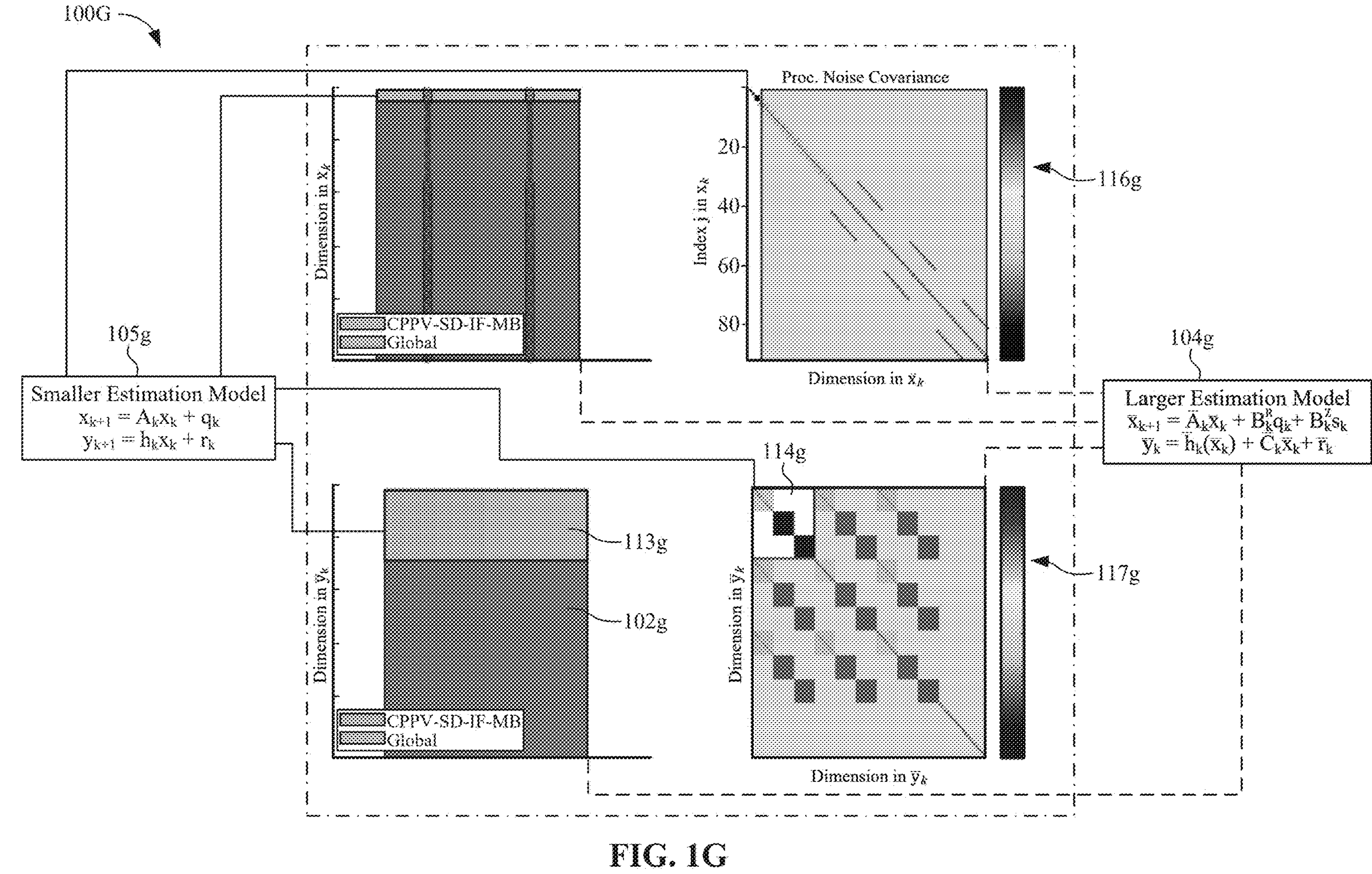
FIG. 1G demonstrates the partitioning of a large GNSS estimation model into a smaller estimation model used to compute a measurement mask.

FIG. 1G illustrates key components of a GNSS estimation defined using common differencing schemes, such as SD and DD, and how the large and small estimation models are related in one embodiment of the present disclosure. FIG. 1G graphically demonstrates how a large estimation model 104*g* can be partitioned into a small estimation model 105*g*. In some embodiments, the prediction model 116*g* is taken to be linear or nonlinear, with some states configured on the real numbers, and others, specifically biases relating to the integer ambiguities configured on the integers. In such a case, the noise driving the prediction model is partitioned into Gaussian noise $q_k$ for the real-valued states, and integer jump noise $s_k$ for the integer valued states, also referred to as the integer ambiguities. In the following, we denote the larger estimation model 104*g* by $$\bar{x}_{k+1} = \bar{A}_k\bar{x}_k + B^R_k\bar{q}_k + B^Z_k s_k$$

$$\bar{y}_k = \bar{h}_k(\bar{x}_k) + \bar{C}_k\bar{x}_k + \bar{r}_k$$

It is understood that this model may include measurement models 117*g* that include undifferenced, single differenced (SD), double differenced (DD), ionosphere-free (IF), and geometry-free (GF) combinations of measurement residuals over one or multiple frequency bands and one or multiple satellite constellations. Furthermore, the large model may be defined with prediction models 116*g* including but not limited to, constant position, constant velocity, and Singer prediction models.

In this exemplar, s all measurements are configured on the real numbers. Here, the measurements related to the pseudo-code measurements are highlighted in 113*g*. In this exemplar, the states are combined in $\bar{x}_k$ 101*g*, which contains the kinematic states of the receiver $x_k$ 115*g*. All the measurements are combined in $\bar{y}_k$ 102*g*, which contains measurements related to the pseudo-ranges $y_k$ 113*g*. The states and measurements are governed by the dynamical system defined above, and it is recognized that, due to the differential independence in the prediction model $\bar{A}_k\bar{x}_k$, a smaller estimation problem can be defined to describe the time-evolution of the kinematic states and the code measurements. In the following, we denote the smaller estimation model 105*g* by $$x_{k+1} = A_k x_k + q_k$$

$$y_k = h_k(x_k) + r_k$$

It is recognized that estimating the position of the receiver based on this smaller estimation model will result in a lower estimation accuracy, as most of the states and much of the measurement information is omitted in the smaller model 105*g*. However, solving the estimation problem using the Kalman filtering and RTS smoothing methods is significantly faster due to its small size, which facilitates the detection of unmodeled biases on the code measurements that deteriorate estimation performance when solving the estimation problem with the larger estimation model. The relationship between the smaller and larger estimation problems is explained throughout FIG. 1G, where the parts of the model that are not related to the smaller estimation model are highlighted in gray boxes with black outline.

For example, the full process noise covariance matrix 103$g$ has a very particular structure arising from the differential relationships assumed between the states in this estimation model. Velocities are the time derivatives of positions, and a change in one implies a change in the other. However, a slight change in position has next to no effect on the time delays experienced when a signal passes though the troposphere. The covariance of the process noise that relates to the kinematic states of the receiver 115$g$ is highlighted in 112$g$. Here, the crosses correspond to the integer random walks associated with the integer ambiguities.

The pseudo-range measurements included in the measurement $y_k$ of the smaller estimation model 113$g$, represent a small number of the total measurements $\bar{y}_k$ that are present in the larger estimation model 102$g$. Similar to the process noise covariance matrix 103$g$, the measurement noise covariance matrix has a 107$g$ has a particular structure, and the covariance matrix of the measurement noise $r_k$ of the smaller estimation model is highlighted top-left block 114$g$.

FIG. 2A shows a block diagram of a system 200$a$ for the tracking of a state of a GNSS receiver according to some embodiments. The estimation system 200$a$ includes an input interface 210$a$ to accept motion data indicative of a change of a state of the receiver and measurements of satellite signals, i.e., carrier signals, code signals and doppler signals, computed form the radio transmissions from a set of GNSS satellites. Each carrier signal includes a carrier phase ambiguity as an unknown integer number of wavelengths of the carrier signal traveled between the satellite and the receiver, wherein a measurement for each satellite signal includes a single difference between the satellite signal transmitted by a satellite and another satellite signal to include a relative position of the receiver of the satellite signal with respect to a position of the satellite subject to integer ambiguity of the carrier signal of the satellite and noise, such that all possible measurements for each satellite signal form a set of measurements. The system 200$a$ can be implemented internally on several devices on which the receiver 240$a$ is located, such as handheld devices, cars, airplanes, trains, or aquatic buoys. Additionally, or alternatively, the system 200$a$ can be communicatively connected to the device, i.e., the receiver 240$a$ is not physically inside the system.

The system also includes a memory 280$a$ storing a prediction model 281$a$, discussed in relation to FIG. 1G, relating a previous state of the receiver to a current state of the receiver estimated in the first and the second estimator, wherein the prediction model is subject to process noise, and a measurement model 282$a$ relating measurements of the carrier signals, code signals, and Doppler signals received by the receiver 240$a$ to the current state of the receiver using the carrier phase ambiguities of the carrier signals, wherein the measurement model relate a subset of the measurements of satellite signals to the current state of the receiver, wherein the maximum size of the subset of measurements is variable and depends on the estimate in the first estimator, and wherein the measurement model is a probabilistic model subject to measurement noise. Due to the inherent random noise and errors of the satellite transmitter and receiver 210$a$, the prediction model and the measurement model are probabilistic, thus allowing several values of the carrier phase ambiguity at any given epoch to be consistent with those models with different probabilities. The memory 280$a$ can also store 284$a$ set of combinations of integer values described by other embodiments.

The system 200$a$ can include additional sensors 220$a$ that can help in aiding the positioning system. For instance, the sensors 220$a$ can include an inertial measurement unit (IMU), a camera, wheel encoders if mounted in a wheeled vehicle, one or more laser ranging sensors, radar sensors and barometers. For example, when connected to a car, the IMU and wheel encoders can be used in a prediction model of the vehicle to increase accuracy of the positioning system beyond what otherwise would be possible.

The system 200$a$ includes a processor 230$a$ for tracking the state of the receiver using a first and a second filter 285$a$. Further, the processor 230$a$ is configured to select 231$a$ a subset of measurements with respect to the set of measurements using statistical masking methods. Also, the processor 230$a$ is configured to execute and/or run the first estimator and the second estimator 232$a$ determining states of the receiver 210$a$ by jointly using the prediction model 281$a$ and the measurement model 282$a$. Each state estimator determines a joint probability distribution of the state of the receiver 210$a$ with respect to the prediction model 281$a$ and the measurement model 282$a$ and can be executed by the processor 230$a$ concurrently and/or sequentially.

The IMU can include 3-axis accelerometer(s), 3-axis gyroscope(s), and/or magnetometer(s). The IMU can provide velocity, orientation, and/or other position related information to the processor 230$a$. In some embodiments, the IMU can output measured information in synchronization with the capture of each image frame from a camera. In some embodiments, the output of the IMU is used in part by the processor 230$a$ to fuse the sensor measurements and/or to further process the fused measurements.

The system 200$a$ can include a transmitter 260$a$ enabled to transmit one or more signals. For instance, the transmitter 260$a$ can send the state of the receiver 240$a$ to other estimation methods, to be used in fusion with other sensors to improve accuracy. The receiver 240$a$ and transmitter 260$a$ can receive and transmit over one or more types of wireless communication networks. The receiver 240$a$ and transmitter 260$a$ can permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, and/or Wireless Wide Area Networks (WWANs) such as LTE, WiMAX, etc. The system 200$a$ can also include one or more ports for communicating over wired networks, such as the controller area network (CAN) bus.

The memory 280$a$ can store 286$a$ carrier phase measurements, code measurements, Doppler measurements, and other signals related to the GNSS signal processing such as SNR, CN, and satellite elevations, as well as data provided by the sensors 220$a$. For example, in some implementations, the memory 280$a$ stores a geometry of the physical construction on which the receiver is mounted 284$a$, and a geometrical relationship between the satellites and the receivers 283$a$. In general, the memory 280$a$ can represent any data storage mechanism. The memory 280$a$ can include, for example, a primary memory and/or a secondary memory. The primary memory can include, for example, a random-access memory, read only memory. While illustrated in FIG. 2A as being separate from the processors 230$a$, all or part of a primary memory can be provided within or otherwise co-located and/or coupled to the processors 230$a$.

The different components in the system 200$a$ can be operatively coupled to other each other through connections 250*a*. The connections 250*a* can comprise buses, lines, fibers, links, or combination thereof.

The processor 230*a* can be implemented using a combination of hardware, firmware, and software. The processor 230*a* can represent one or more circuits configurable to perform at least a portion of a computing procedure or process related to sensor fusion and/or methods for further processing the fused measurements. The processor 230*a* retrieves instructions and/or data from memory 280*a*. The processor 230*a* can be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

Figure 2B:
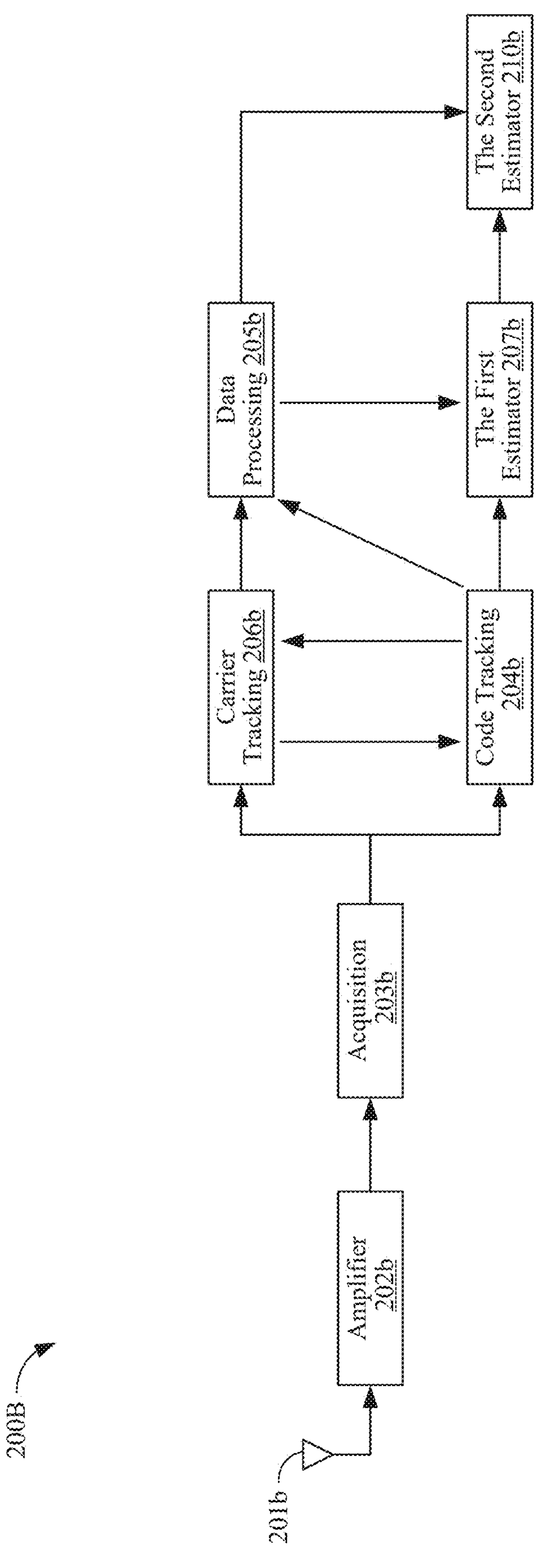
FIG. 2B shows a block diagram of a receiver used by some embodiments.

FIG. 2B shows a block diagram of a receiver used by some embodiments. In those embodiments, the measurements to detect the presence of multi-path 207*b* are computed by the first estimator and the state of the device is computed in the second estimator 210*b*. After the antenna 201*b*, and before acquisition 203*b*, the received signal is made up of the sum of the signals emitted by each satellite. In some embodiments, an amplifier 202*b* is used to strengthen the signals before further processing. The acquisition 203*b* initializes the tracking process by supplying estimates for the phase and frequency of each received satellite signal. The tracking unit is tasked with estimating and providing measurements of the phase and frequency of each satellite signal over time for the carrier wave 206*b* and for code tracking 204*b*. The code tracking 204*b* is used to determine and process 205*b* the data messages. In one embodiment, the code measurements are also used to determine signals indicative multi-path using the first estimator 207*b*. Using the signals indicative of multi-path and the measurements from the data processing 205*b*, the state of the device or receiver is estimated in the second estimator 210*b*.

It is recognized that some GNSS receivers can have several antennae for a single receiver, and combinations of several antennae with as many receivers are possible. One embodiment uses multiple antennae with as many receivers as antennae. The antennae are spatially separated, which allows the receivers to detect differences between the observed carrier frequencies on the same satellite signal.

Figure 3A:
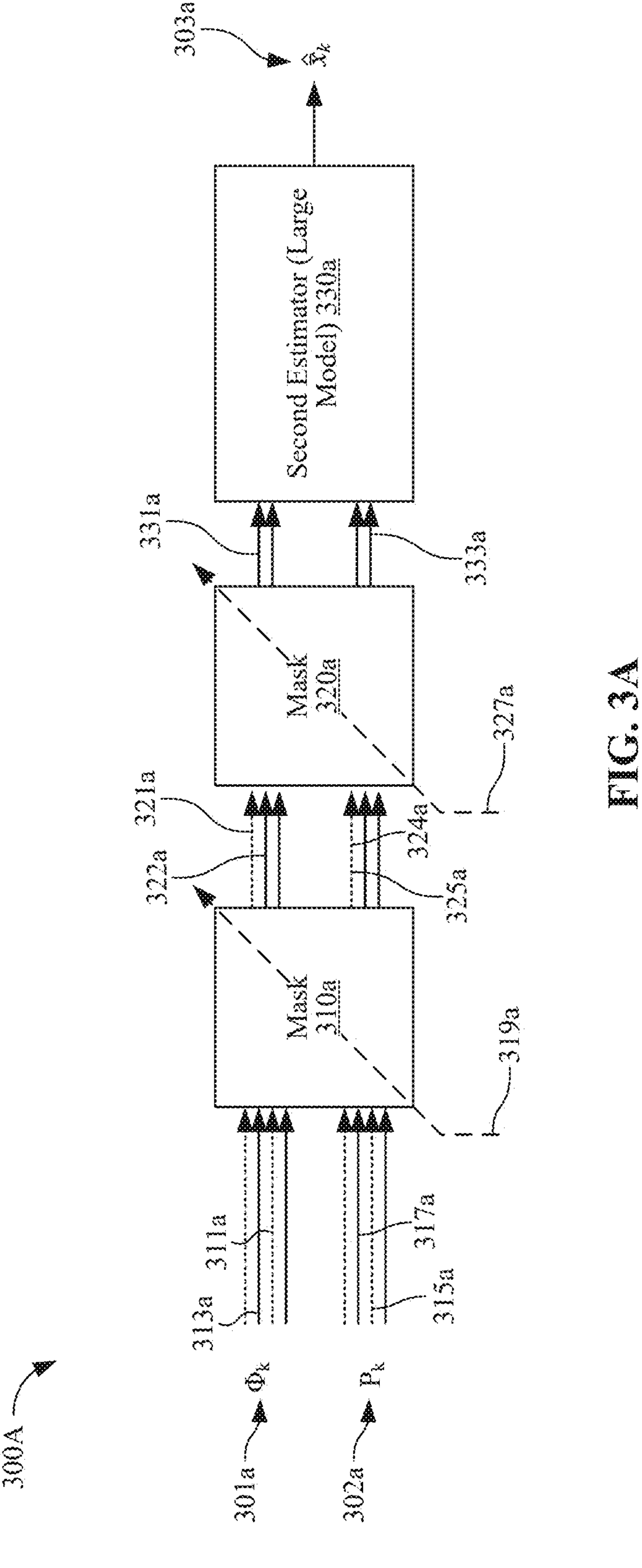
FIG. 3A describes how measurements are masked in conventional GNSS estimation methods using code and carrier-phase measurements as exemplars.

FIG. 3A shows a conventional approach to computing a measurement mask in prior art, which is sometimes used in place of the first estimator 207*b* or as part of the data processing 205*b*. In this masking, measurement information such as code 301*a* and carrier phase 302*a* measurements containing both inlier measurements 313*a*, 317*a*, and outlier measurements 311*a*, 315*a*, are passed into a function 310*a* that applies a measurement mask computed in the signal-to-noise ratios or carrier-to-noise density ratios of the measurements 319*a*. The first function 310*a* removes some outlier measurements by applying a measurement mask, before passing the resulting measurements 321*a*, 322*a*, 324*a*, 325*a* to a second function. In the second function, a different measurement mask is applied based on the elevation of the satellites 327*a*. The resulting masked measurements 331*a*, 333*a* are subsequently passed to the second estimator operating on an estimation model with a large state-space including the integer ambiguities. This estimator is in this exemplar a filter and produces an estimate of the state of the large estimation model 303*a*.

It is understood, that the first and the second mask may be complemented by other masks, such as masks based on shadow masking, wherein the geometry of the world in which the receiver is moving is used to detect satellites that have a line of sight communication with the receiver, such as the satellite 101*f* in FIG. 1F, while removing measurements from satellites that are non-line of sight, such as 102*f* in FIG. 1F. It is also recognized that other signals in the computation of the measurements can be used to determine additional masks using techniques such as machine learning, but that such techniques necessarily operate on instantaneous samples of these indicative signals or a brief time window of these signals.

It is understood that the machine learning techniques may require adaptation to function for different environments, different receivers which provide different definitions of SNR and CN 319*a*, different satellite constellations, and so on. This approach is contrasted with the technique disclosed in the present invention, in which the measurement mask is determined sequentially using filtering or smoothing techniques based on modeling errors detected in the estimation model, and how likely an estimation model is to have produced the acquired measurement data given a long sequence of measurements. It is understood that the disclosed method can be applied to different environments, any definition of SNR and CN, and any satellite constellation.

Figure 3B:
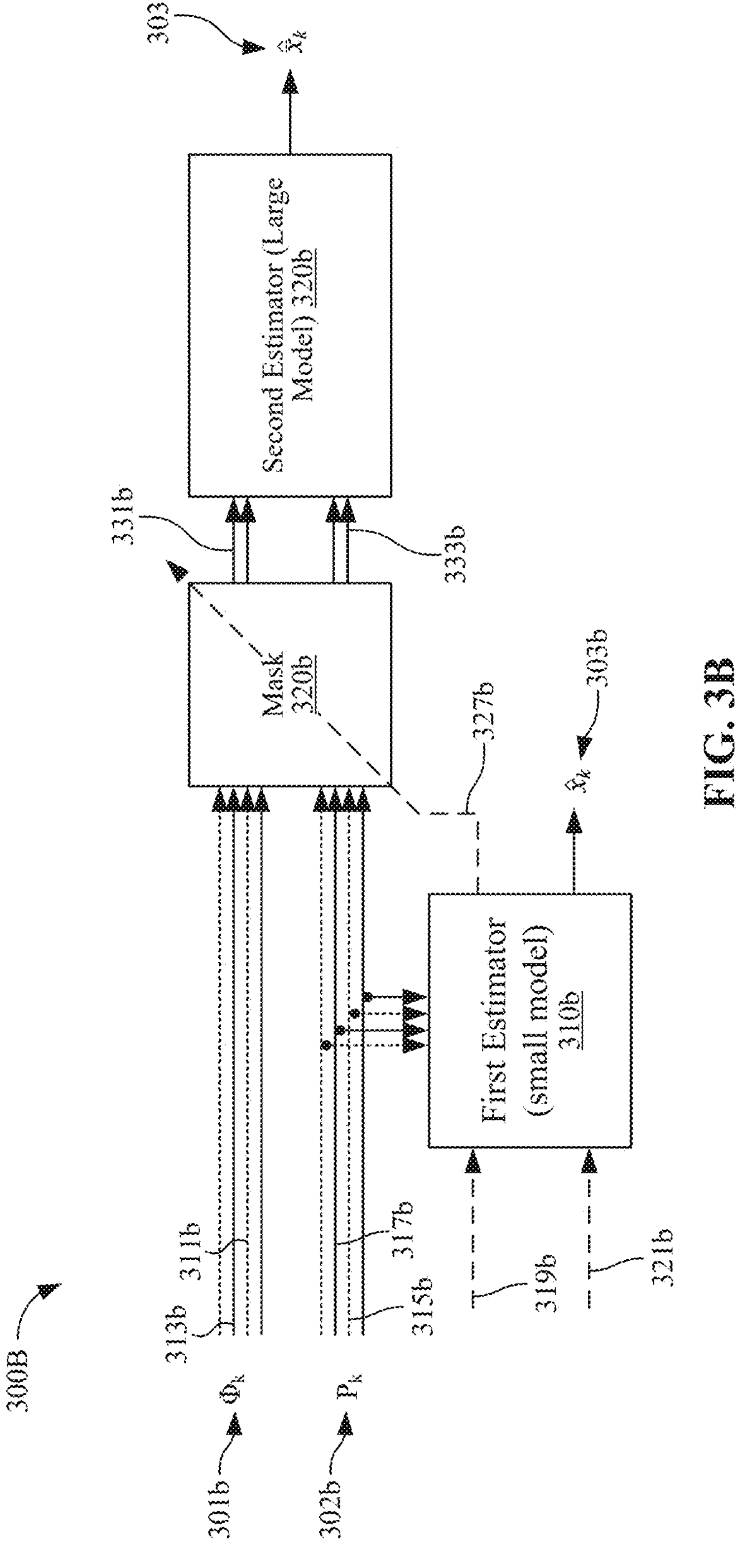
FIG. 3B describes the statistical measurement masking method of the present invention using code and carrier-phase measurements as exemplars.

FIG. 3B shows how the statistical measurement masking method in the present disclosure differs from the sequence of measurement masks applied in FIG. 3A. Instead of computing a sequence of measurement masks using heuristic methods, the code measurements are provided to the first estimator 310*b* operating with the smaller estimation model, to estimate the states of the receiver while simultaneously determining the measurement model and its statistics associated with the code measurements. The method 310*b* optionally uses information such as the signal-to-noise ratio 319*b* and satellite elevation 321*b* to influence the estimates of the measurement mask in ways that differ for different embodiments of the method. The statistical measurement masking method operates on the code measurements 301*b* and produces a measurement mask 322*b* and optionally a poor estimate of the receiver states 303*b*. This is referred to as the first estimator 207*b* in FIG. 2B and operates with the smaller estimation model depicted in FIG. 1G. The measurement mask is subsequently applied to the measurement such as the code measurement 301*b* and the carrier phase measurements 302*b*, comprising both inlier measurements free from multi-path 313*b*, 317*b* and outlier measurements 311*b*, 315*b*. Having applied the measurement mask 320*b*, the measurements that are free from multi-path and other biases due to modeling errors are sent to the second estimator 330*b* operating with the large estimation model depicted in FIG. 1G, which computes an accurate estimate of the device of the state, including the integer ambiguities.

It is understood that the statistical measurement masking can be combined with other masks, such as but not limited to, shadow masking, wherein the geometry of the world in which the receiver is moving is used to detect satellites that have a line-of-sight communication with the receiver, while removing measurements from satellites that are non-line of sight, as depicted in FIG. 2F.

As part of the disclosure, two separate embodiments of the statistical measurement masking is described. The first embodiment uses mixture modeling techniques to estimate the probability that a sequence of models in a bank of estimation models has given rise to the measurements of the small estimation problem. This technique is hereinafter referred to as Interactive Bayesian Masking (IBM) and is described in relation to FIGS. 4A, 4B, 4C, 4D, 4E. The second embodiment uses variational inference methods to adapt a continuum of noise covariance matrices in the smaller estimation model associated with the first estimator. Based on modeling mismatch captured by these noise statistics, the presence or absence of multi-path related to individual satellite signals can be inferred. This technique is hereinafter referred to as Variational Bayesian Masking (VBM) and is described in relation to FIGS. 5A, 5B, 5C, 5D. These exemplars are based on filtering formulations (estimating the current state with the current and past measurements) and it is understood that there are direct analogies of these methods for smoothing as well (which includes future measurements operating on batches of data) and that both techniques represent embodiments of the disclosed statistical measurement masking.

Figure 4A:
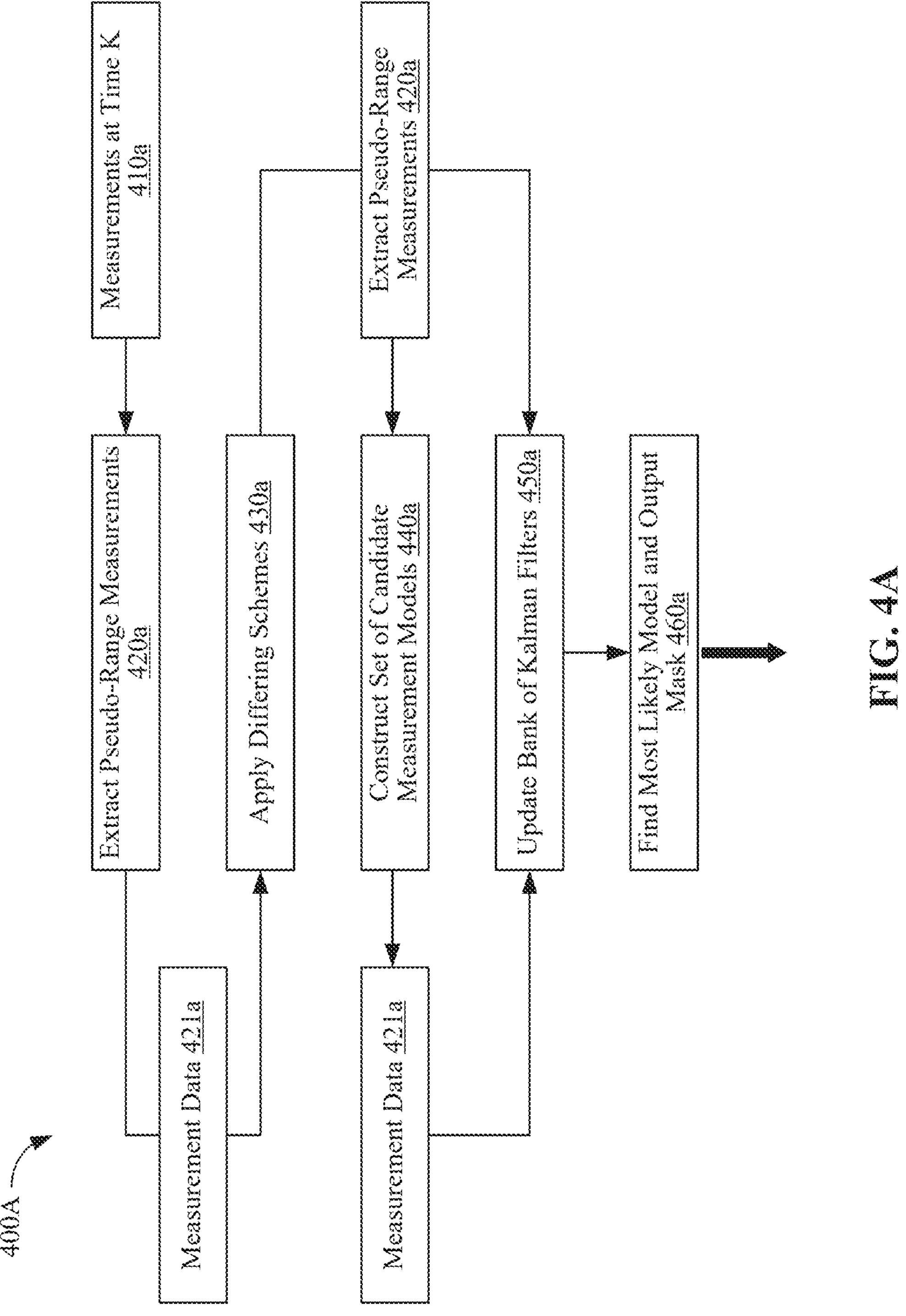
FIG. 4A illustrates an embodiment that computes the measurement mask using a bank of Kalman filters in an interactive mixture modeling framework.

FIG. 4A shows a block diagram of one embodiment of the statistical measurement masking implemented using a bank of Kalman filters or smoothers in an interactive mixture modeling framework. The GNSS measurements are sampled at a time k 410*a* and from these, the pseudo-range measurements are extracted 420*a* resulting in the measurement data 421*a*. Differencing schemes are applied to the code measurements, mirroring the techniques used in the large model of the second estimator 330*b*, and may include undifferenced, single differenced, double differenced, ionosphere-free, geometry-free schemes, or any combination thereof. After applying the relevant differencing schemes 430*a*, the measurement residuals are used to construct or modify an existing set of measurement models 440*a*. These models are discussed in relation to FIG. 4B and FIG. 4C. Based on the set of measurement models 441*a* and the measurement residuals 431*a*, a bank of Kalman filters are updated 450*a*. Each particle in this bank of Kalman filters contains a state estimate in terms of a mean estimate and a covariance estimate, and a mode probability. The update 450*a* consists of computing mixing probabilities, mixing the particles in the filter bank, updating the particles based on the measurement residuals, computing mode probabilities from the mixing probabilities, and a Kalman filter update in each particle in the Kalman filter bank. The procedure for one embodiment of the invention is described in more detail in relation to FIG. 4D. Having performed the measurement update at a time k, the most likely model in the bank is found, i.e., the model with the highest mode probability 460*a*. This model corresponds to a particular combination of inliers and outliers in the different dimensions of the measurement residuals, and can be used to form a binary mask, detailing the measurement residuals that are affected by modeling error from multi-path or other sources. This mask specifies is certain combinations of satellites, receivers, and frequency bands should be removed in the second estimator at a time k.

Figure 4B:
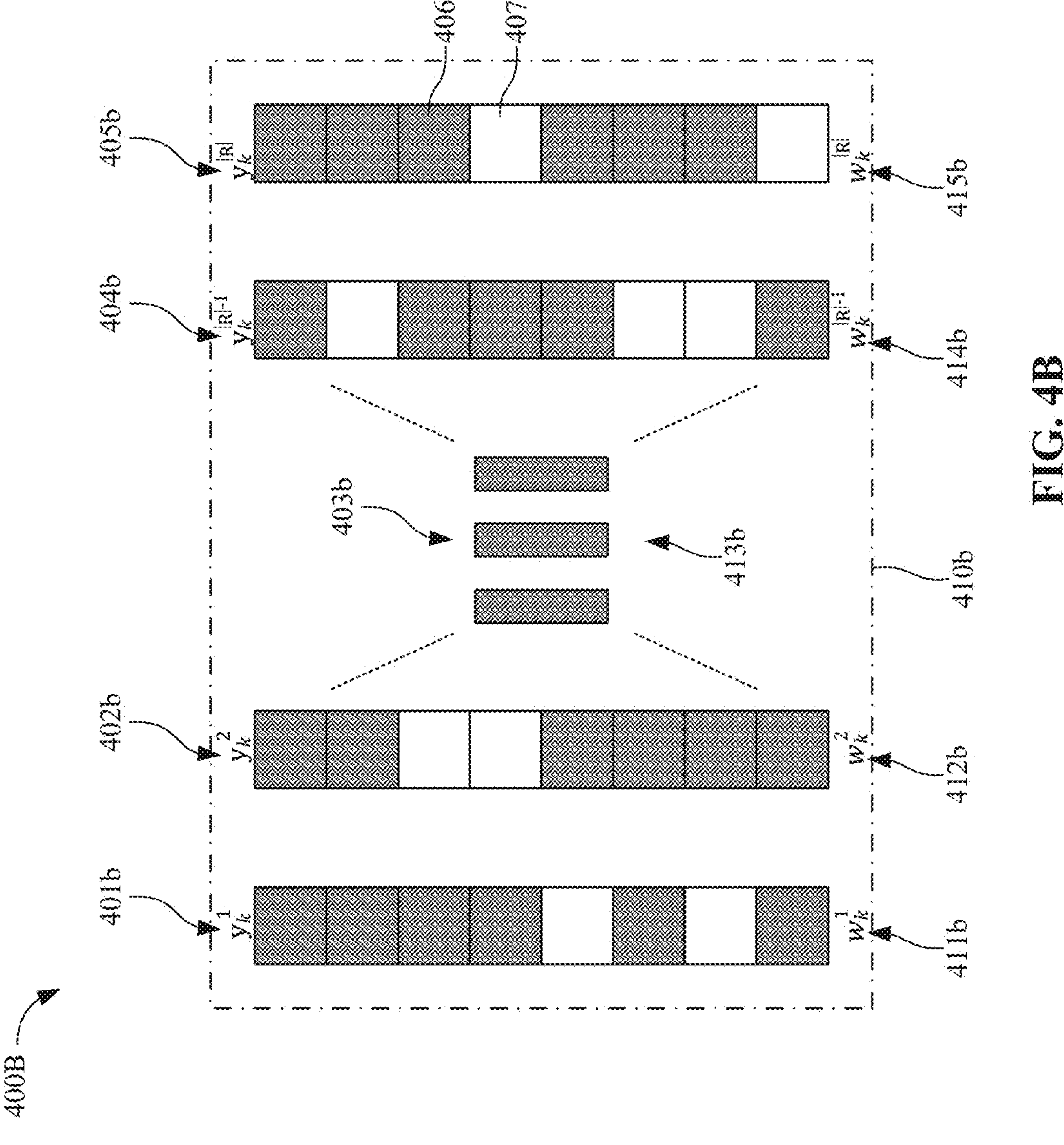
FIG. 4B demonstrates the difference between the measurement models in the bank of Kalman filters in one embodiment of the invention.

FIG. 4B depicts a bank of particles in the Interactive Bayesian Masking, where the measurement models associated with the Kalman filters in the bank 410*b* differ in the dimension of the measurement vector. The measurements modeled in the first particle 401*b*, second particle 402*b*, mth particle 403*b*, second to last particle 404*b*, and the last particle 105*b* are depicted. The dimensions of the measurement that are included in the last particle are highlighted in gray 406*b* and the elements that are excluded are highlighted in white 407*b*. In this exemplar, it is understood that the measurements modeled in each particle of the Kalman filter bank 410*b* may have different dimensionality. It is also understood that covering all possible combinations of outliers results in a large number of particles. Therefore, one embodiment only evaluates candidate models that have at most $N_o$ outliers, reducing the number of particles in the Kalman filter bank. A set of $$R = \{h_k^m(x_k) + r_k^m \mid m \text{ is integer}\}$$

measurement models are considered, where the size of R is determined by the number $N_o$ and the maps $$h_k^m$$

and nose covariance of $$r_k^m$$

are found from the smaller estimation model described in relation to FIG. 1G. The measurement models relate to the measurements 401*b*, 402*b*, 403*b*, 404*b*, 405*b* as $$y_k^m = h_k^m(x_k) + r_k^m$$

and there is a total of |R| in this exemplar.

Each model associated with a particle in the bank of particles 410*b* has a mode probability, and the probabilities of 1st particle 411*b*, the 2nd particle 412*b*, the mth particle 413*b*, the second to last particle 414*b*, and the last particle 415*b* are depicted. These probabilities are updated based on the measurement information, and permit the recursive computation of a sequence of integers $m_{0:k}=\{m_0, \ldots, m_k\}$ from a sequence of measurements $y_{0:k}=\{y_0, \ldots, y_k\}$ of the smaller measurement model, where $m_k$ is the integer associated with the most likely particle in the bank of particles at a time k.

Figure 4C:
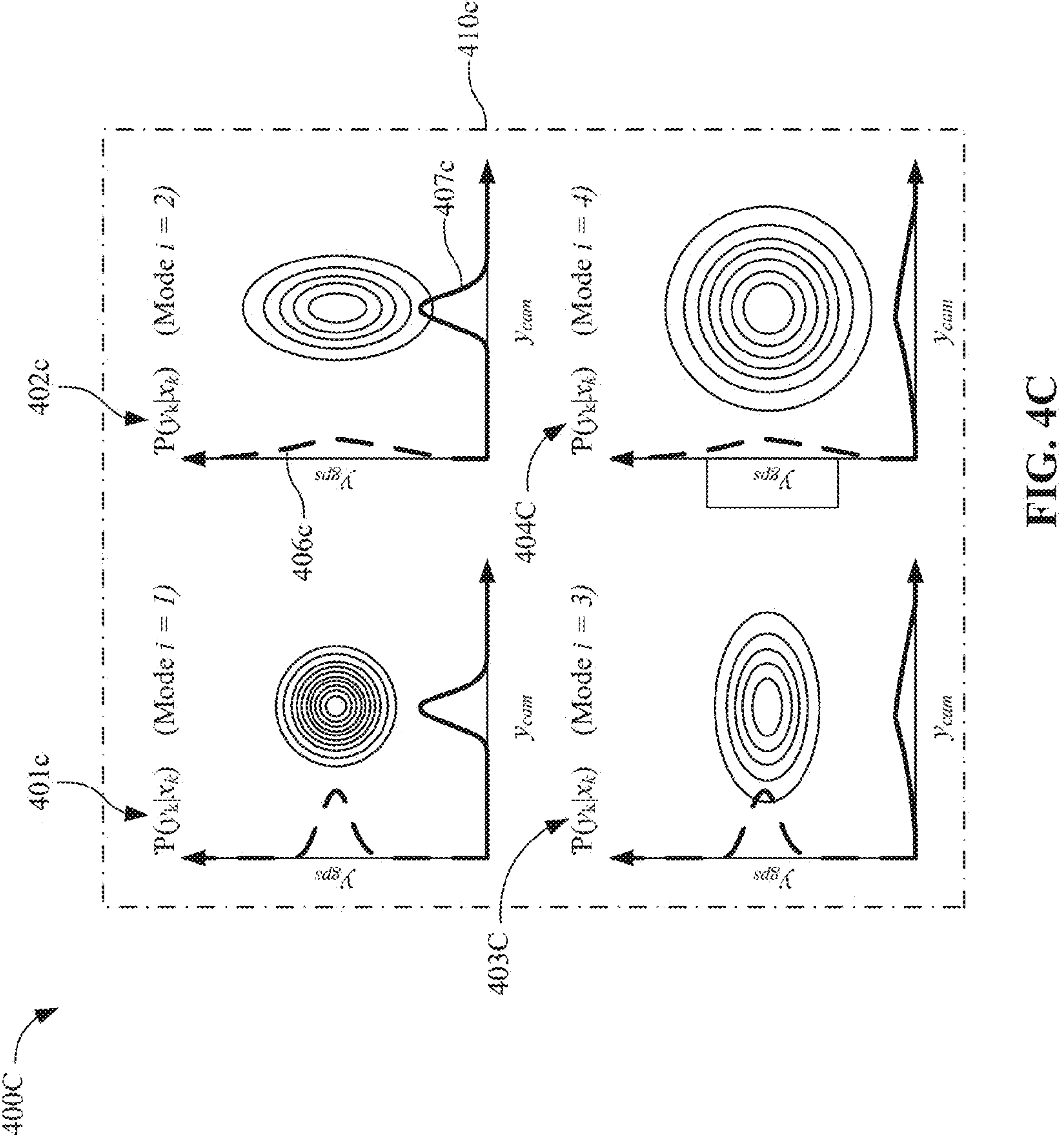
FIG. 4C demonstrates the difference between the measurement models in the bank of Kalman filters in an alternative embodiment of the invention.

FIG. 4C shows a different embodiment of the interactive mixture modeling where a bank of particles is associated with measurement models which differ in the variance of individual measurement dimensions. The first two dimensions of the measurement model $p(y_k|x_k)$ are depicted corresponding to the first four of the |R| models associated with the particles in the filter bank 410*c*. The first model 301*c* has a low variance in the first two dimensions, corresponding to inlier measurements, the second and third models 402*c*, 403*c* model one inlier and one outlier measurement in the first two dimensions of the measurement vector, and the fourth model 404*c* defines outliers in first two dimensions of the measurement. In this embodiment, the outlier is associated with a high measurement noise variance 406*c* while the inlier is associated with a low measurement noise variance 407*c*.

It is understood that the measurement models used in the interactive masking method may comprise of a mix of measurements that remove the elements from the measurement vector as in FIG. 4B and models that increase the variance of individual dimensions as in FIG. 4C.

Figure 4D:
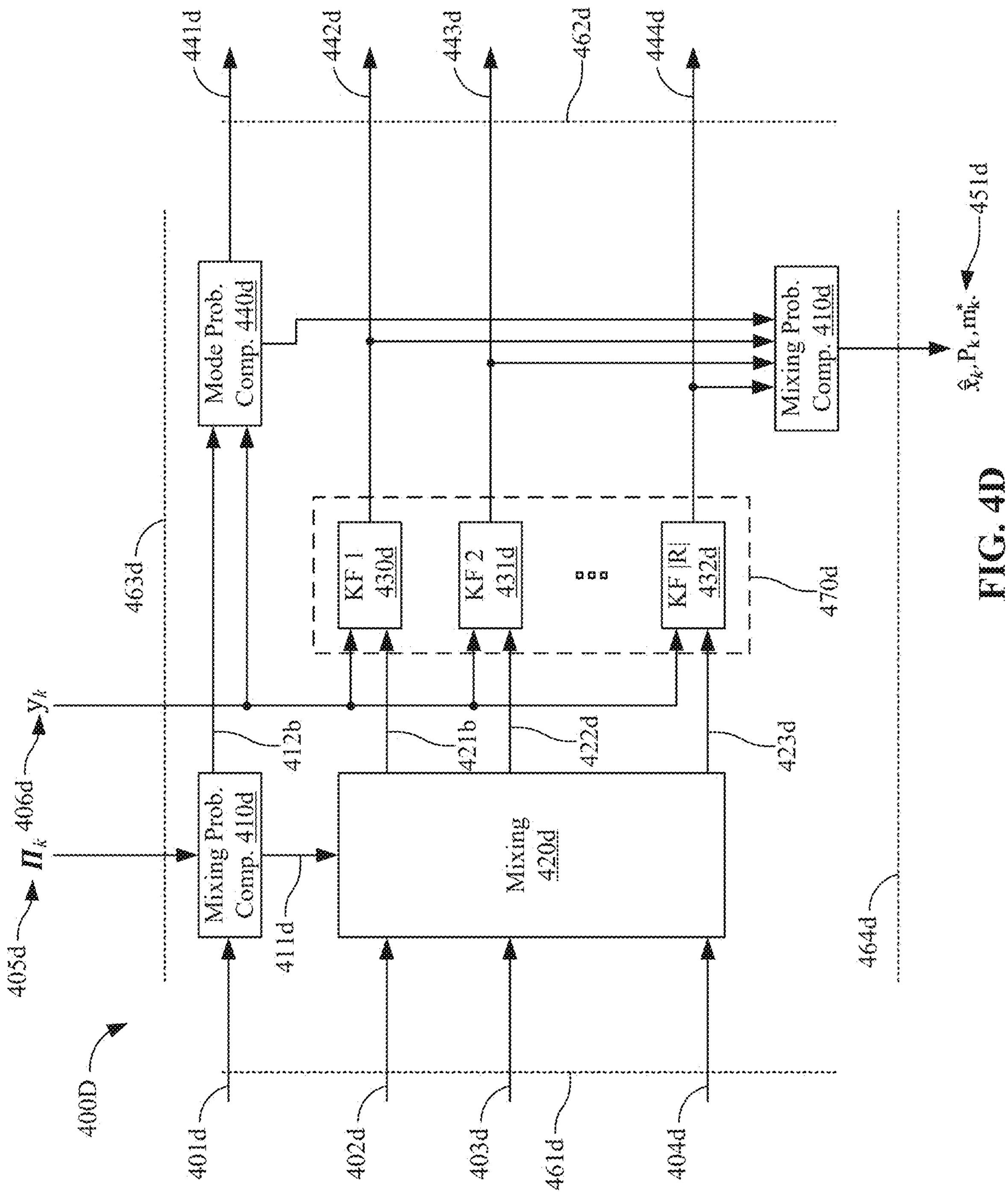
FIG. 4D details an embodiment that implements interactive masking, in particular information is passed between the different components of the method.

FIG. 4D shows a block diagram of the Bayesian measurement masking implemented using interactive mixture methods. The information propagates from left to right in time, and from input to output in the top of the schematic to the bottom of the schematic. Information that is necessarily stored in memory over the transition in time step (k−1) to k and the transition k to (k+1) are indicated by the dotted lines 461_d_ and 462_d_, respectively. This information includes at least the estimates from each particle in the filter bank 470_d_ and the mode probabilities 411_b_-415_b_, indicated by the arrows 421_d_-423_d_. In some embodiments, the estimates are represented by a Gaussian distribution with a mean and covariance for each particle here denoted $$\{(m^m_{k|k}, P^m_{k|k})\}^{|R|}_{m=1}$$

and a mode probability associated with each particle $$\{w^m_{k|k}\}^{|R|}_{m=1}.$$

In this embodiment, the mean and covariance are shown for the first two and the last particle with at the transition (k−1) to k in 402_d_, 403_d_, 404_d_ and the transition k to (k+1) in 442_d_, 443_d_, 444_d_, and the set of mode probabilities for the transitions (k−1) to k and k to (k+1) are shown in 401_d_ and 441_d_, respectively.

Similarly, the algorithm takes two inputs per time step, indicated as crossing the input line 463_d_. The sampled measurements of the smaller estimation model 406_d_ and the transition probability matrix 405_d_. The transition probability matrix is a square matrix containing a number of rows equal to the number of models in the filter bank 470_d_. The outputs of the algorithm is represented as the arrows passing the output line 464_d_. This output includes an estimate of the state, which in this embodiment is represented by a Gaussian distribution with a mean and a covariance 451_d_. In addition, the method outputs the most likely model to have given rise to the measurements sampled at a time k denoted $$m^*_k$$

451_d_.

The estimator takes the mode probabilities and transitions these using the transition probability matrix using a simple multiplication in the computation of the mixing probabilities 410_d_. This results in a set of mixing probabilities $$\{\bar{w}^{ij}_{k|k}\}^{|R|,|R|}_{i=1,j=1}$$

411_d_, 412_d_ that are used to mix the estimates of the particles provided as input to the method 402_d_, 403_d_, 404_d_. In one embodiment, these mixing probabilities are computed $$\bar{w}^{ij}_{k-1|k-1} = \frac{\left[\prod_k\right]_{ji}}{\sum_{l=1}^{|R|}\left[\prod_k\right]_{li} w^m_{k-1|k-1}}.$$

Based on the mixing probabilities a set of mixed estimates are computed 421_d_, 422_d_, 423_d_. The mixing step is conducted as follows:

$$\hat{x}^{0i}_{k-1|k-1} = \sum_{j=1}^{|R|} \bar{w}^{ji}_{k-1|k-1}\hat{x}^{j}_{k-1|k-1}$$

$$\hat{P}^{0i}_{k-1|k-1} = \sum_{j=1}^{|R|} \bar{w}^{ji}_{k-1|k-1}\left[\hat{P}^{i}_{k-1|k-1} + \left(\hat{x}^{j}_{k-1|k-1} - \hat{x}^{0i}_{k-1|k-1}\right)\left(\hat{x}^{j}_{k-1|k-1} - \hat{x}^{0i}_{k-1|k-1}\right)^T\right]$$

The gaussian density $$N\left(\hat{x}^{0i}_{k-1|k-1}, \hat{P}^{0i}_{k-1|k-1}\right)$$

serves as the prior for a Kalman filter prediction and update done in each of the particles 430_d_, 431_d_, 432_d_, producing estimates $$N\left(\hat{x}^{0i}_{k|k}, \hat{P}^{0i}_{k|k}\right).$$

It is understood that these updates can be done using explicit approximations of linear maps to any nonlinearities in the estimation model associated with each particle in the filter bank 470_d_ or using statistical regression techniques and moment matching as described in relation to FIG. 1D and FIG. 1E.

The innovation error in the Kalman filter update, the error between the predicted and the sampled measurement, is used to update the mode probabilities of the particles 440_d_. Let L(m; k) denote the Gaussian likelihood of the innovation error in the Kalman filter update of the mth particle at a time k. Then, in one embodiment, the mode probability weight update is done according to this Gaussian measurement likelihood, taking the mixing probabilities 412_d_ as input and producing updated mode probabilities 441_d_ as follows $$w^i_{k|k} = \frac{L(i;k)\sum_{j=1}^{|R|}\left[\prod_k\right]_{ji} w^j_{k-1|k-1}}{\sum_{j=1}^{|R|} L(l;k)\sum_{j=1}^{|R|}\left[\prod_k\right]_{jl} w^j_{k-1|k-1}}.$$

From the updated mode probabilities 441_d_ and particle estimates 442_d_, 443_d_, 444_d_, an estimate is computed 450_d_. In one embodiment, this estimate is found using the law of total probability to combine a portion of each particle based on its mode probability in computing the estimate.

$$\hat{x}_k = \sum_{j=1}^{|R|} w^i_{k|k}\hat{x}^i_{k|k}.$$

$$P_k = \sum_{i=1}^{|R|} w^i_{k|k}\left[\hat{P}^i_{k|k} + \left(\hat{x}_k - \hat{x}^i_{k|k}\right)\left(\hat{x}_k - \hat{x}^i_{k|k}\right)^T\right].$$

In this step, the most likely model is computed with respect to the updated mode probabilities $$\{w^m_{k|k}\}^{|R|}_{m=1}$$

computed in 440_d_. Specifically, the most likely model is computed as $$m_k^* = \underset{m}{\operatorname{argmax}}\left(\{w_{k|k}^m\}_{m=1}^{|R|}\right).$$

Figure 4E:
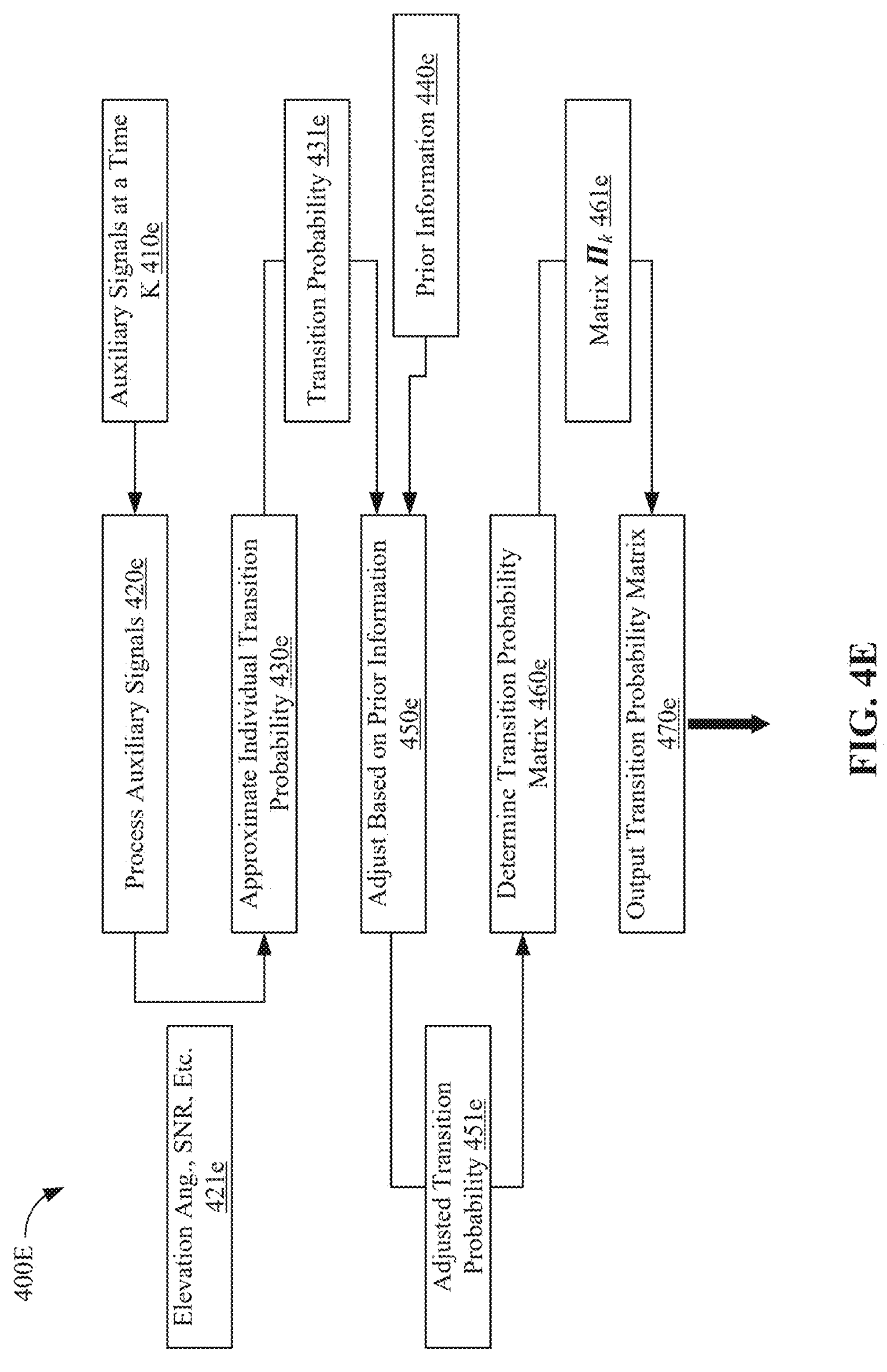
FIG. 4E details how auxiliary signals from the GNSS signal processing and prior information can be incorporated in the transition probabilities of the interactive measurement masking.

FIG. 4E shows how the transition probabilities of the interactive masking method can be adapted to accommodate auxiliary signals from the GNSS processing and prior information. The auxiliary signals 410*e* may include but are not limited to satellite elevation angles, signal-to-noise ratios, carrier-to-noise density ratios, satellite health indicators, and other indicators of communication quality. As the definitions of many such signals differ between different satellite systems and receivers, the data is processed 420*e* to yield signals with known definitions independent of receiver and satellite system 421*e*. Based on these signals individual transition probabilities are approximated. For example, if the SNR value is abnormally low in the communication between one satellite and the receiver, then transitioning from models with outliers in this satellite to models that describe inliers in this satellite is associated with a lower probability, and transitioning from models with inliers in this satellite to models that describe outliers in this satellite is associated with a higher probability. The transition probability for each satellite is defined on the interval [0,1] and by multiplying such probabilities for each individual measurement dimension, a total probability of transitioning from one model to another can be computed 430*e*.

These transition probabilities 431*e* can further be augmented by using prior information such as the geometry of the world and if a satellite is expected to be line-of-sight or not. For example, the probability of transitioning from inlier to outlier in measurements associated with a specific satellite can be increased if it is expected to be in non-line-of-sight conditions. Such adjustments of the transition probabilities 450*e* based on prior information 440*e* results in adjusted transition probabilities. These are subsequently combined into a transition probability matrix $\Pi_k$ at a time k. The element at a row j and column i indicates the probability of a model $m_{k-1}=i$ transitioning to another model $m_k=j$ at the temporal transition k−1 to k. The adapted transition probability matrix 461*e* is the output 470*e* and taken as input in the interactive masking method 405*d*.

It is understood that the transition probability matrix can be updated based on auxiliary signals and information gathered at the same time as running the interactive filter, but it is also recognized that the transition probability matrix can be fixed for all time steps.

Figure 5A:
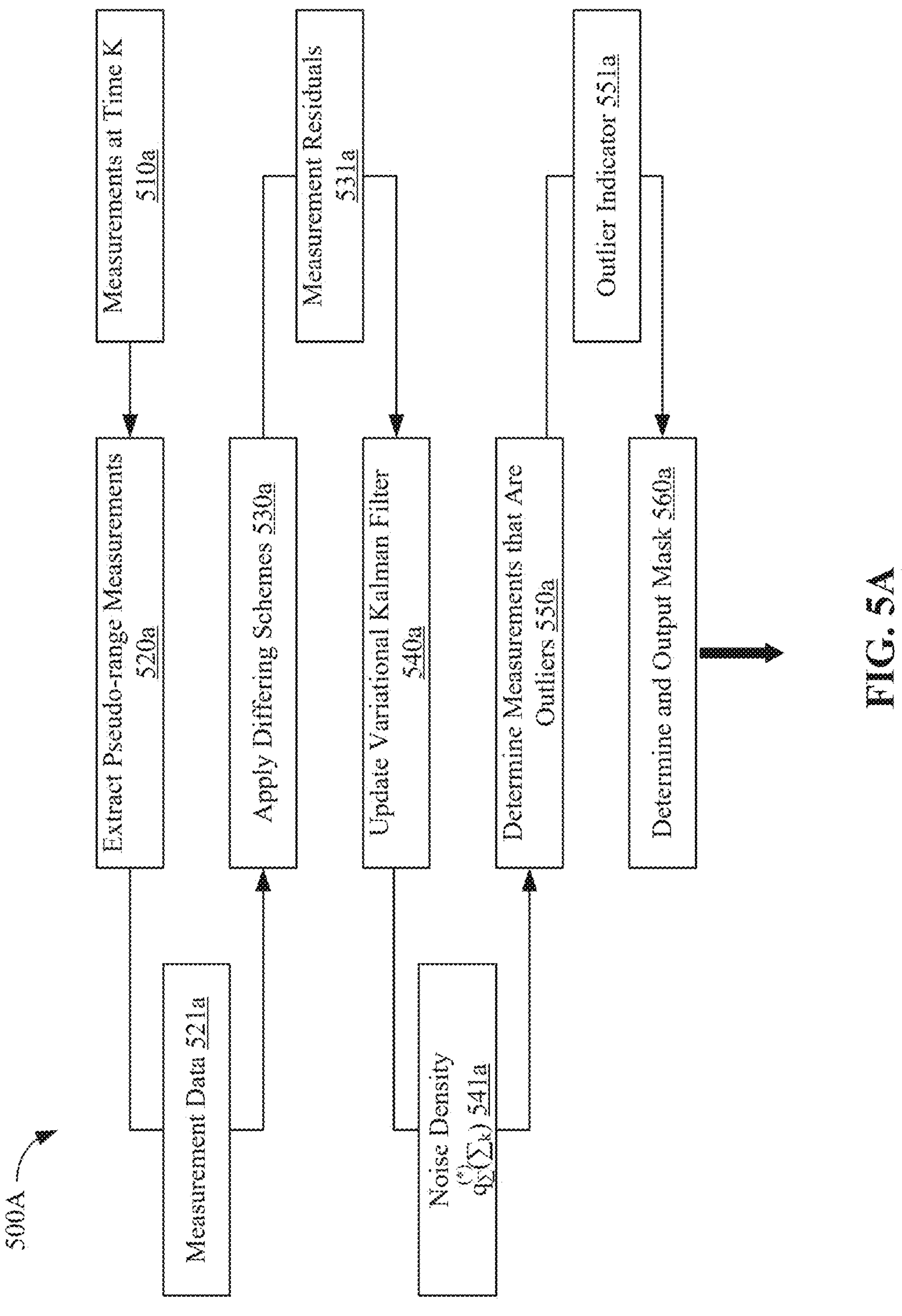
FIG. 5A illustrates an embodiment that computes a measurement mask using methods of variational inference.

FIG. 5A shows a block diagram of one embodiment of the variational Bayesian measurement masking implemented. The GNSS measurements are sampled at a time k 510*a* and from these, the pseudo-range measurements are extracted 520*a* resulting in the measurement data 521*a*. Differencing schemes are applied to the code measurements, mirroring the techniques used in the second estimator 330*b*, and may include undifferenced, single differenced, double differenced, ionosphere-free, geometry-free schemes, or any combination thereof. After applying the relevant differencing schemes 530*a*, the measurement residuals are used in a variational Kalman filter 540*a* to recursively estimate the state of the smaller estimation model and the measurement noise covariance. This smaller estimation model is discussed in relation to FIG. 1G. One output of this filter is a probability density function over the noise parameters $$q_\Sigma^{(*)}\left(\sum\nolimits_k\right)$$

541*a*. In this section $\Sigma_k$ denotes the noise covariance of the noise $r_k$ in the smaller estimation model. Based on this density, statistics are computed 550*a* and subjected to a threshold determining the dimensions of the measurement $y_k$ that are affected by modeling errors or multi-path. This produces signals indicative of outliers 551*a*, which can be converted into a measurement mask provided in the output 560*a*.

It is understood that several different forms of $$q_\Sigma^{(*)}\left(\sum\nolimits_k\right)$$

can be considered in the spirit of the invention and that various statistics of this density function can be used to formulate the outlier indicator signals. One such example of a noise density and relevant indicators is discussed in relation to FIG. 5B, and the variational method is described in greater detail in relation to FIGS. 5C and 5D.

Figure 5B:
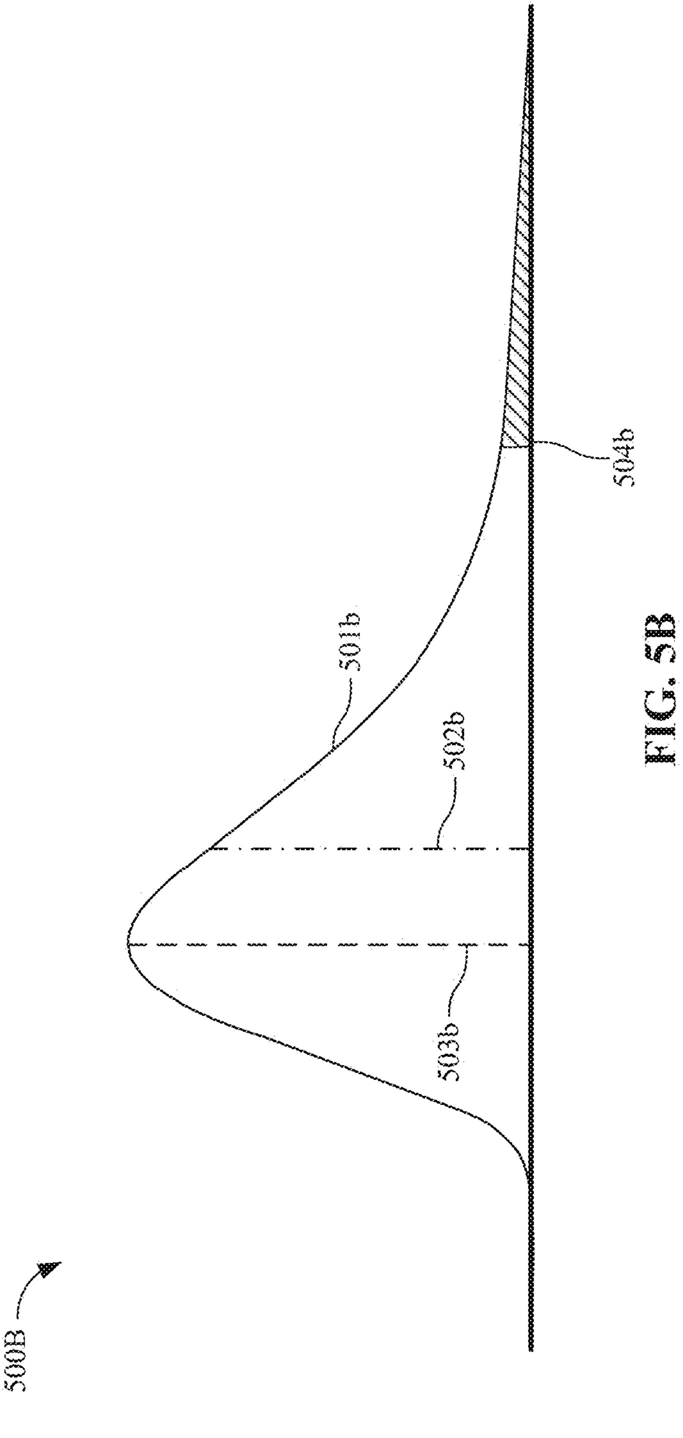
FIG. 5B illustrates the posterior distribution over individual noise elements in the variational method, and key statistics of this distribution.

FIG. 5B shows the probability density function of an inverse Wishart distribution in one dimension, also known as an inverse Gamma distribution 501*b*. In the multi-variate setting, a positive number of degrees of freedom, v, and a shape matrix, V, dictate the statistical properties of the distribution, defined as follows $$IW\left(\sum; v, V\right) \propto |\sum|^{-\frac{v+n+1}{2}} \exp\left(-\frac{1}{2}\operatorname{trace}\left(V\sum\nolimits^{-1}\right)\right).$$

It is understood that the mean of the inverse Wishart distribution 502*b* can be computed as $$E_{IW(\Sigma;v,V)}\left[\sum\right] = (v-n-1)^{-1}V,$$

and that the mode of the inverse Wishart distribution 403*b* can be computed similarly as $(v-n+1)^{-1}V$. Furthermore, it is known that specific quantiles 504*b* of the density can be evaluated using expressions involving the incomplete gamma function.

This allows for efficient checking of individual dimensions of the noise covariance, as any of these statistical properties of the inverse Wishart distribution can be used as the outlier indicator 551*a*. For example, in one embodiment using single difference between pairs of satellites, the measurement associated with the negative satellite in the difference scheme corresponding to the ith element in the measurement vector can be labeled as an outlier if the associated diagonal element of the noise covariance estimate following $IW(\Sigma_k; v_k, V_k)$ at a time k exceeds a threshold $\epsilon>0$. That is, if $[E_{IW(\Sigma_k;v_k,V_k)}[\Sigma_k]]_{ii}>\epsilon$, the measurements associated with the associated satellite is deemed to be corrupted by modeling errors such as multi-path.

Figure 5C:
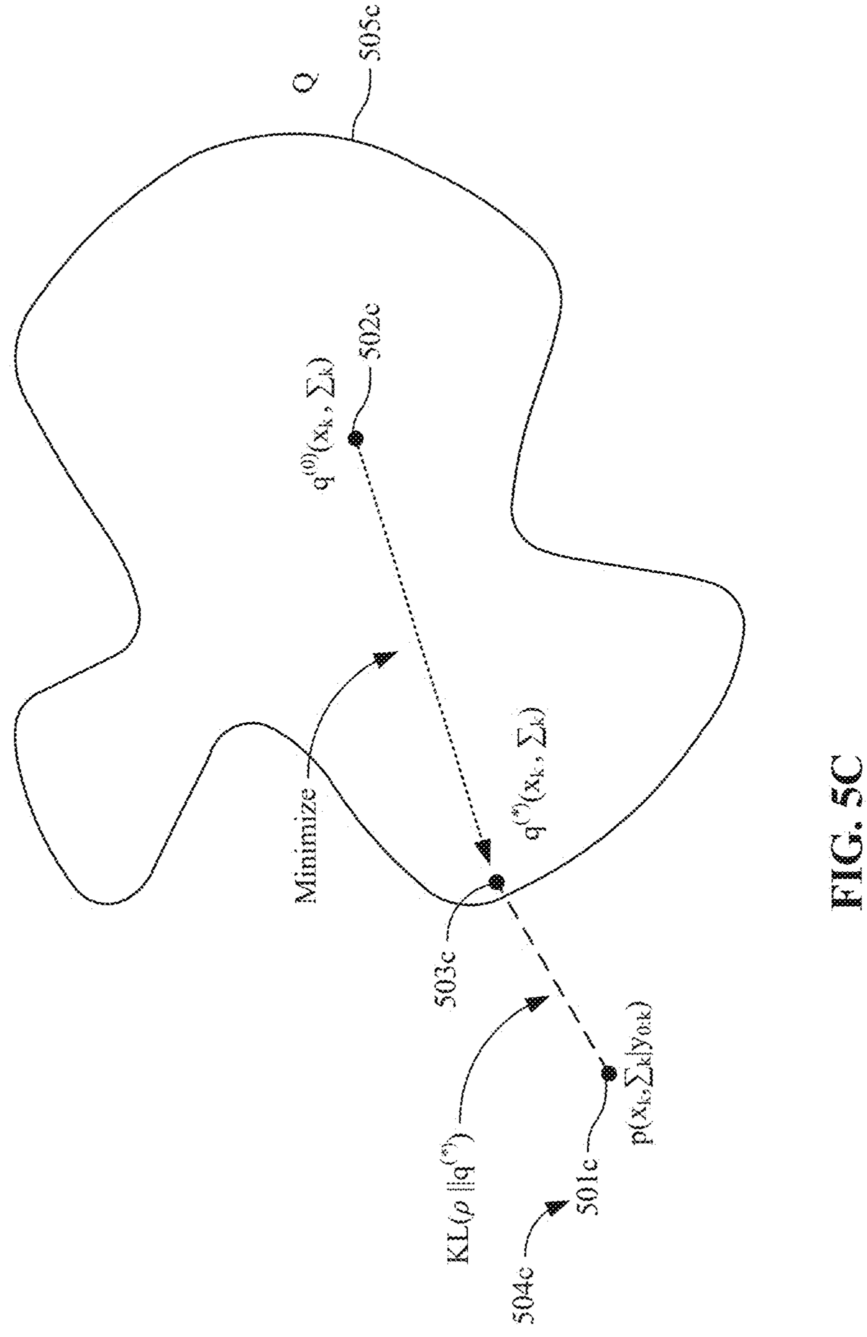
FIG. 5C illustrates how a density in a certain family of densities is optimized towards the true posterior density by minimizing a KL divergence.

FIG. 5C illustrates the general idea of the variational inference problem. In one embodiment, it is assumed that the measurement noise covariance of the small estimation model follows the inverse Wishart distribution in FIG. 5B, that is, $q_\Sigma(\Sigma_k)=IW(\Sigma_k; v_k, V_k)$ and that the state estimate follows a Gaussian distribution $q_x(x_k)=N(x_k; m_k, P_k)$. In one embodiment, these are taken to be approximately independent, with a joint density $q(x_k, \Sigma_k)=q_x(x_k)q_\Sigma(\Sigma_k)\in \mathcal{Q}$. When solving the variational inference problem, the parameters of the two distributions 502*c* are updated in order to find the distribution this family of distributions $\mathcal{Q}$ 505*c* that best approximates the true posterior 501*c*. It is understood that the true posterior may not lie within the class of admissible density functions 505*c*, but that we can steer the density in a suitable direction by minimizing a well-chosen objective function.

It is understood that in the context of the estimation model associated with the first filter in FIG. 1G, choosing the objective function of the optimization problem as the Kullback-Leibler divergence 504*c* facilitates an update of the parameters associated with 501*c* that steers it toward the optimal solution 503*c*. Minimizing $$q^{(*)}\left(x_k, \sum_k\right) = \underset{q}{\operatorname{argmin}}\left[KL\left(p\left(x_k, \sum_k \mid y_{0:k}\right)\middle\|q\left(x_k, \sum_k\right)\right)\right],$$

with $q(x_k, \Sigma_k)$ factored as an inverse Wishart and Gaussian distribution becomes a fixed-point iteration that, in one embodiment, is implemented approximately using first order approximations of the nonlinearities of the measurement model. If using first-order approximations of the nonlinearities of the estimation model, if the solution at the ith iterate at a time step k is denoted $$q^{(i)}\left(x_k, \sum_k\right) = IW\left(\sum_k; v_k^{(i)}, V_k^{(i)}\right)N\left(x_k; m_k^{(i)}, P_k^{(i)}\right),$$

these fixed-point iterations are started from the estimate at the previous time step $$q^{(*)}\left(x_{k-1}, \sum_{k-1}\right) = IW\left(\sum_{k-1}; v_{k-1}^{(*)}, V_{k-1}^{(*)}\right)N\left(x_{k-1}; m_{k-1}^{(*)}, P_{k-1}^{(*)}\right),$$

This density is predicted forward in time through prediction models, yielding the estimate $$IW\left(\sum_k; v_k^-, V_k^-\right)N(x_k; m_k^-, P_k^-)$$

which is used as a starting point for the fixed-point iterations. These iterations are subsequently implemented with $$v_k^{(i+1)} = v_k^- + 1$$

$$\hat{\sum}_k^{(i+1)} = E_{IW\left(\Sigma_k; v_k^{(i)}, V_k^{(i)}\right)}\left[\sum_k\right]$$

$$S_k^{(i+1)} = H_k P_k^- (H_k)^T + \hat{\sum}_k^{(i+1)}$$

$$K_k^{(i+1)} = P_k^- (H_k)^T \left(S_k^{(i+1)}\right)^{-1}$$

$$m_k^{(i+1)} = m_k^- + K_k^{(i+1)}(y_k - h(m_k^-))$$

$$P_k^{(i+1)} = P_k^- - K_k^{(i+1)} S_k^{(i+1)} \left(K_k^{(i+1)}\right)^T$$

$$V_k^{(i+1)} = V_k^- + \left(y_k - h\left(m_k^{(i+1)}\right)\left(y_k - h\left(m_k^{(i+1)}\right)^T + H_k P_k^{(i)} (H_k)^T\right.\right.$$

These iterations can be run for a fixed number of steps, until the change in the updated parameters is sufficiently small, or a combination of both. For example, one convergence criteria can be defined as $$\left\|m_k^{(i+1)} - m_k^{(i)}\right\| \leq \varepsilon$$

for some threshold ε>0, but it is understood that several other convergence criteria may be used. In other embodiments, the fixed-point iterations are implemented using statistical linearizations akin to the moment matching techniques used in the linear regression Kalman filtering described earlier in association with FIG. 1D.

While here exemplified in a filtering setting, it is recognized that the method can be implemented with smoothing techniques in the spirit of the invention, then involving a backward pass as described in FIG. 1E if done using an RTS smoother.

Figure 5D:
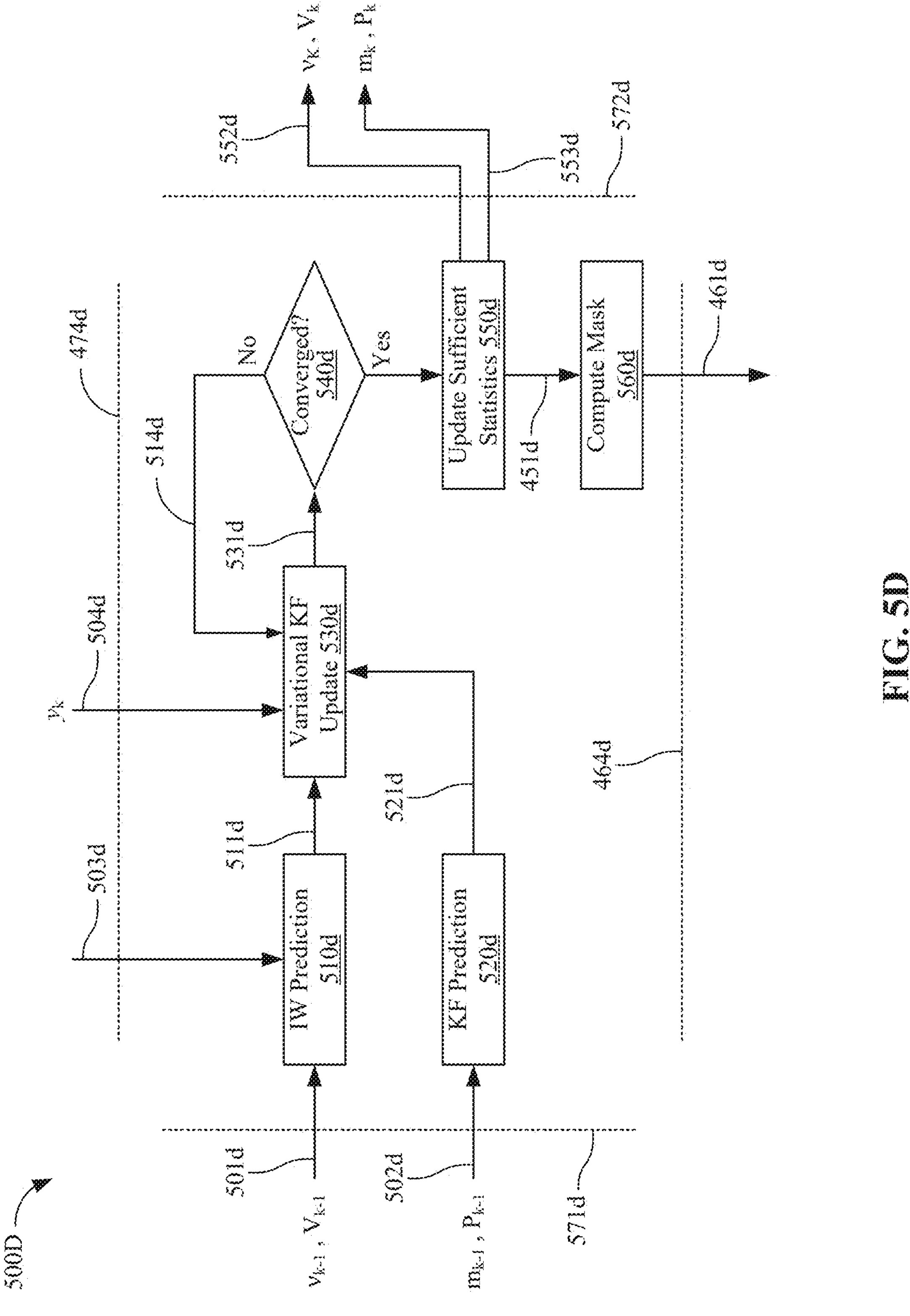
FIG. 5D details an embodiment that implements variational masking and shows how information is passed between the different modules of the method.

FIG. 5D demonstrates how the variational measurement masking can be implemented according to one embodiment of the invention. The information propagates from left to right in time, and from input to output in the top of the schematic to the bottom of the schematic. Information that is necessarily stored in memory over the transition from (k−1) to k and the transition k to (k+1) are indicated by the dotted lines 571*d* and 572*d*, respectively. In some embodiments, this information includes at least the parameters of the probability distribution $q(x_{k-1}, \Sigma_{k-1})$, in this exemplar, the parameters of the inverse Wishart 501*d* and Gaussian 502*d* densities. The outputs are the parameters corresponding to the distribution at the time k $q(x_k, \Sigma_k)$ in terms of the inverse Wishart parameters 552*d* and the Gaussian parameters 553*d*.

Similarly, the variational masking method takes two inputs per time step, indicated as crossing the input line 574*d*. The sampled measurements of the smaller estimation model 504*d* and auxiliary signals from the GNSS processing such as signal-to-noise ratios and known geometries 503*d*. Based on the inputs and the parameters 501*d*, 502*d* stored in memory from the time step (k−1) to k, and the auxiliary signals 503*d*, the parameters of $q(x_{k-1}, \Sigma_{k-1})$ are predicted forward in time 510*d*, 520*d*, producing the predicted inverse Wishart parameters 511*d* and the predicted Gaussian parameters 521*d*, corresponding to the parameters of the density $$IW\left(\sum_k; v_k^-, V_k^-\right)N(x_k; m_k^-, P_k^-)$$

defined previously. Based on these parameters and the measurements associated with the smaller estimation model 504*d*, the variational update 530*d* is done by the fixed-point iterations described in association with FIG. 5C. This results in an updated parameters, and if the convergence criteria is not met 540*d*, these parameters are returned to perform yet another variational update 530*d*. This procedure is repeated until meeting the convergence criteria defined previously. At this point, the parameters of the density $q(x_k, \Sigma_k)$ are set as the optimal solution produced by the fixed-point iterations 551*d*, the parameters associated with the updated inverse Wishart density 522*d* and Gaussian density 523*d* are stored in memory until the next time step. From the updated parameters 551*d*, a mask is computed by computing multipath indicator signals from the density associated with the measurement noise $q_\Sigma(\Sigma_k)$. For example, this can be done by a threshold on the mode, the mean, or the quantile functions, as explained in relation to FIG. 5B. The multipath indicators are then used to form a measurement mask, where multipath or modeling errors detected in a specific code measurement is used to remove the code measurement and its carrier-phase counterpart from the larger estimation model, in accordance with FIG. 3B.

Figure 6:
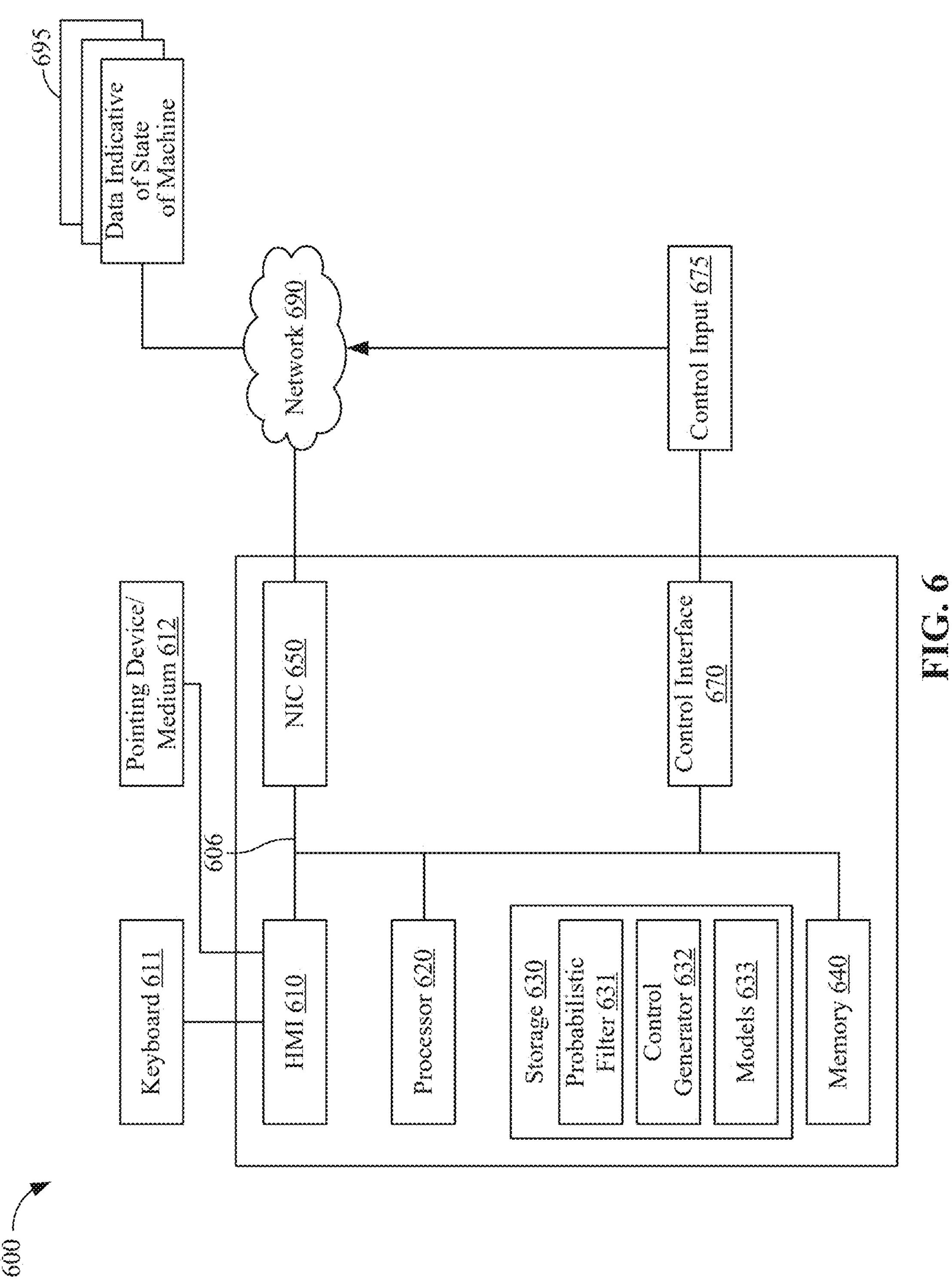
FIG. 6 shows a block diagram of a post-processing solution used to aid tracking of mixed-autonomy vehicles in accordance with some embodiments.

FIG. 6 shows a block diagram of a system 600 for joint tracking and/or control of receivers such as vehicles or aquatic buoys in accordance with some embodiments. The system 600 can have a number of different interfaces connecting the system 600 with other machines and devices. A network interface controller (NIC) 650 includes a receiver adapted to connect the system 600 through the bus 606 to a network 690 connecting the systems 600 to receive GNSS and other sensory data from the receivers.

In some implementations, the system is configured only to track the state of the one or more receivers. In some embodiments where the receivers are attached to mobile vehicles, the method is configured to further control the motion of the vehicle either individually or as a platoon. To that end, in some embodiments, the APP system 600 is configured to receive the traffic state of a group of mixed-autonomy vehicles traveling in the same direction, wherein the group of mixed-autonomy vehicles includes controlled vehicles willing to participate in a platoon formation and at least one uncontrolled vehicle, and wherein the traffic state is indicative of a state of each vehicle in the group and the controlled vehicle. For example, in one embodiment the traffic state includes current headways, current speeds, and current acceleration of the mixed-automata vehicles. In some embodiments, the mixed-automata vehicles include all uncontrolled vehicles within a predetermined range from flanking controlled vehicles in the platoon.

The NIC 650 also includes a transmitter adapted to transmit the control commands to the controlled vehicles via the network 690. To that end, the system 600 includes an output interface, e.g., a control interface 670, configured to submit the control commands 675 to the controlled vehicles in the group of mixed-autonomy vehicles through the network 690. In such a manner, the system 600 can be arranged on a remote server in direct or indirect wireless communication with the mixed-automata vehicles.

The system 600 can also include other types of input and output interfaces. For example, the system 600 can include a human-machine interface 610. The human-machine interface 610 can connect the controller 600 to a keyboard 611 and pointing device 612, wherein the pointing device 612 can include a mouse, trackball, touchpad, joystick, pointing stick, stylus, or touchscreen, among others.

The system 600 includes a processor 620 configured to execute stored instructions, as well as a memory 640 that stores instructions that are executable by the processor. The processor 620 can be a single-core processor, a multi-core processor, a computing cluster, or any number of other configurations. The memory 640 can include random access memory (RAM), read-only memory (ROM), flash memory, or any other suitable memory machines. The processor 620 can be connected through bus 606 to one or more input and output devices.

The processor 620 is operatively connected to a memory storage 630 storing the instructions as well as processing data used by the instructions. The storage 630 can form a part of or be operatively connected to the memory 1040. For example, the memory can be configured to store probabilistic estimation model 631, the APP algorithms and related data 633, and, optionally, control generator 632.

The processor 620 is configured to determine control commands for the controlled vehicles that indirectly control the uncontrolled vehicles as well. To that end, the processor is configured to execute a control generator 632 to determine control commands based on the state of the vehicles. In some embodiments, the control generator 632 uses a deep reinforcement learning (DRL) controller trained to generate control commands from the augmented state for an individual and/or a platoon of vehicles.

Figure 7A:
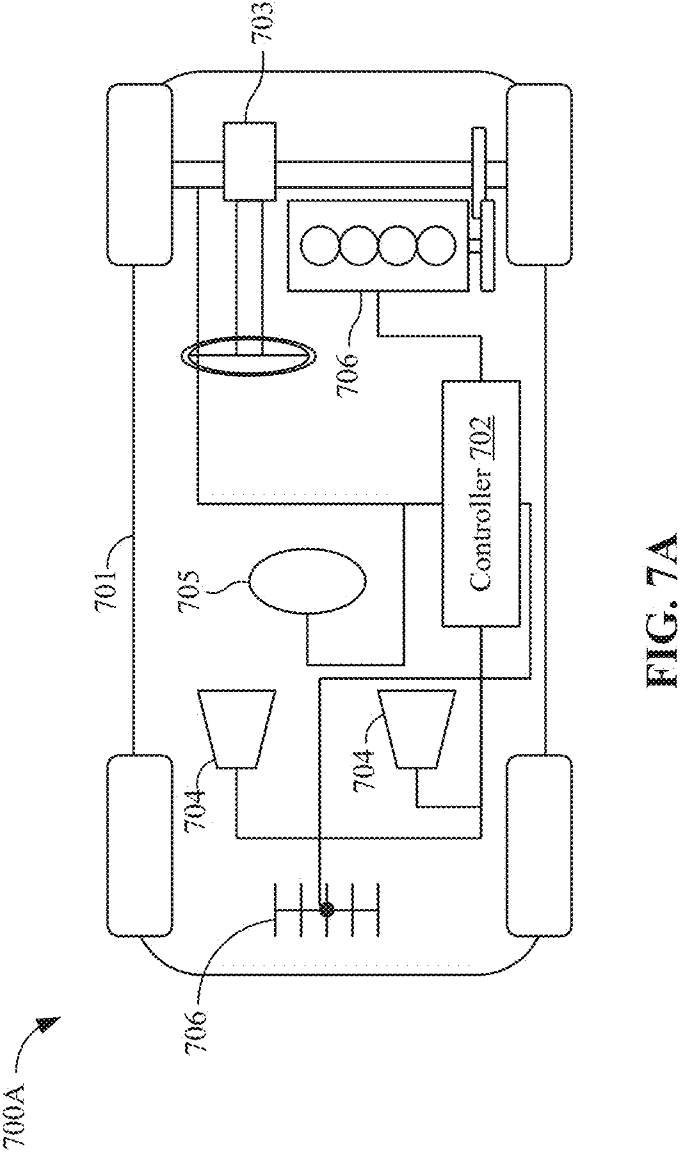
FIG. 7A shows a schematic of a vehicle controlled directly or indirectly according to some embodiments.

FIG. 7A shows a schematic of a vehicle 701 controlled directly or indirectly according to some embodiments. As used herein, vehicle 701 can be any type of wheeled vehicle, such as a passenger car, bus, or rover. Also, vehicle 701 can be an autonomous or semi-autonomous vehicle. For example, some embodiments control the motion of vehicle 701. Examples of the motion include the lateral motion of the vehicle controlled by a steering system 703 of the vehicle 701. In one embodiment, the steering system 703 is controlled by the controller 702 in communication with the system 600. Additionally or alternatively, the steering system 703 can be controlled by a driver of vehicle 701.

The vehicle can also include an engine 706, which can be controlled by the controller 702 or by other components of the vehicle 701. The vehicle can also include one or more sensors 704 to sense the surrounding environment. Examples of the sensors 704 include distance range finders, radars, lidars, and cameras. The vehicle 701 can also include one or more sensors 705 to sense its current motion quantities and internal status. Examples of the sensors 705 include GNSS signals, accelerometers, inertial measurement units, gyroscopes, shaft rotational sensors, torque sensors, deflection sensors, pressure sensor, and flow sensors. The sensors provide information to the controller 702. The vehicle can be equipped with a transceiver 706 enabling communication capabilities of the controller 702 through wired or wireless communication channels.

Figure 7B:
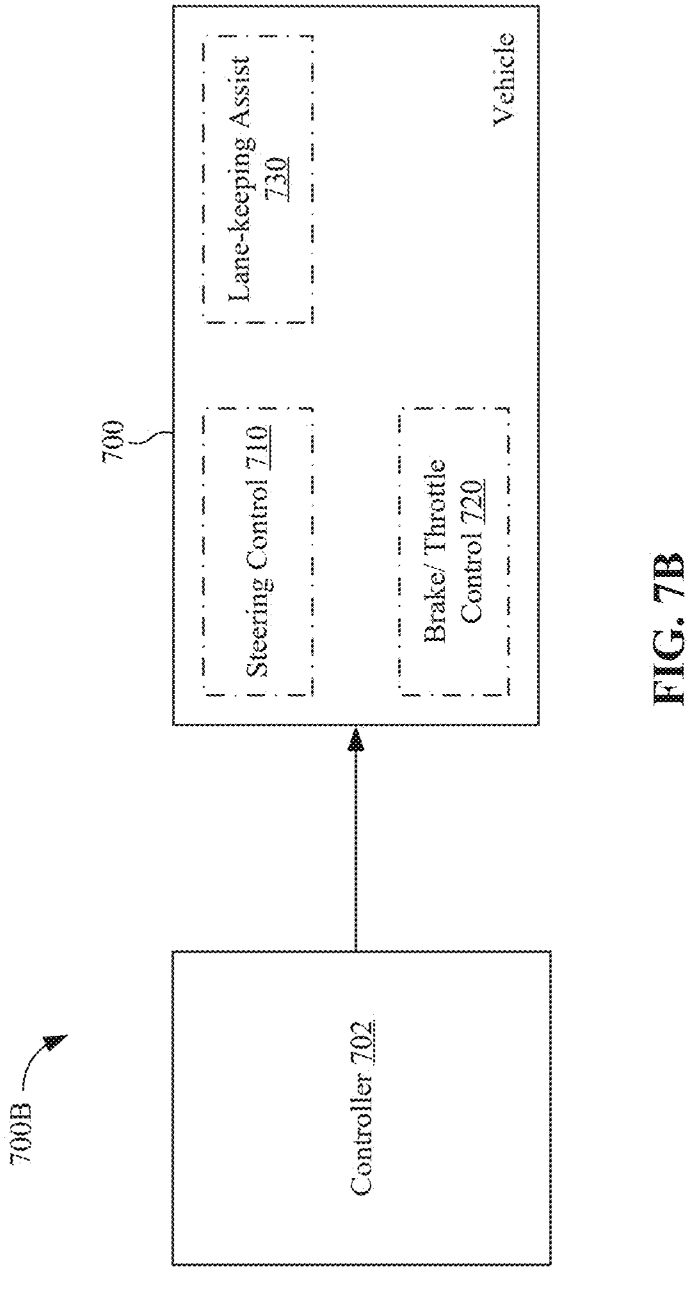
FIG. 7B shows a schematic of interaction between the controller receiving controlled commands from the system and the controllers of the vehicle according to some embodiments.

FIG. 7B shows a schematic of interaction between the controller 702 receiving controlled commands from the system 600 and the controller 700 of the vehicle 701 according to some embodiments. For example, in some embodiments, the controllers 700 of the vehicle 701 are steering 710 and brake/throttle controllers 720 that control rotation and acceleration of the vehicle 700. In such a case, the controller 702 outputs control inputs to the controllers 710 and 720 to control the state of the vehicle. The controllers 700 can also include high-level controllers, e.g., a lane-keeping assist controller 730 that further processes the control inputs of the predictive controller 702. In both cases, the controllers 700 maps use the outputs of the predictive controller 702 to control at least one actuator of the vehicle, such as the steering wheel and/or the brakes of the vehicle, to control the motion of the vehicle. States of the vehicular machine could include position, orientation, and longitudinal/lateral velocities; control inputs could include lateral/longitudinal acceleration, steering angles, and engine/brake torques. State constraints on this system can include lane-keeping constraints and obstacle avoidance constraints. Control input constraints may include steering angle constraints and acceleration constraints. Collected data could include position, orientation, velocity profiles, accelerations, torques, and/or steering angles.

The above-described embodiments of the present invention can be implemented in numerous ways. For example, the embodiments may be implemented using hardware, software, or a combination thereof. When implemented in software, the software code can be executed on any suitable processor or collection of processors, whether provided on a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of several suitable programming languages and/or programming or scripting tools and may be compiled as executable machine language code or intermediate code that is executed on a framework or virtual machine. Typically, the functionality of the program modules may be combined or distributed as desired in various embodiments.

In addition, the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A method for tracking a state of a device based on transmissions from a global navigation satellite system (GNSS), wherein the method is executed by a processor coupled with stored instructions implementing the method, wherein the stored instructions, when executed by the processor to carry out steps of the method, comprising:

collecting GNSS measurement data of satellite signals transmitted from multiple satellites, wherein the GNSS measurement data include code measurements, carrier phase measurements and doppler measurements of the satellite signals;

executing multiple probabilistic estimators concurrently tracking the state of the device using at least two measurement models relating the GNSS measurement data with the state of the device, wherein the multiple probabilistic estimators include a first estimator tracking the state of the device based on a first measurement model using the code measurements, and wherein the multiple probabilistic estimators include a second estimator tracking the state of the device based on a second measurement model using the GNSS measurement data masked by a binary mask blocking a subset of GNSS measurement data of a subset of the satellite signals based on values of coefficients of the binary mask, wherein the number of measurements in the first measurement model is smaller than the number of measurements in the second measurement model;

determining the values of coefficients of the binary mask based on outputs of the first estimator;

determining the state of the device based on outputs of the second estimator;

outputting the state of the device determined by the second estimator, wherein the device is a GNSS receiver of a vehicle, such that the state of the device indicates a state of the vehicle; and controlling movement of the vehicle based on the state of the vehicle.

2. The method of claim 1, wherein each of the coefficients of the binary mask corresponds to one of the satellite signals of one of the multiple satellites, and wherein the values of coefficients of the binary mask are determined based on a statistical relationship of the code measurements of each of the satellite signals with a state estimate indicated by the outputs of the first estimator.

3. The method of claim 1, further comprising:

generating a plurality of measurement models, each corresponding to a different subset of the code measurements;

estimating the state of the device using each of the plurality of measurement models of code measurements to produce multiple state estimates;

comparing the multiple state estimates with each other to determine one or multiple outlier code measurements of outlier satellite signals causing deviation in the multiple state estimates; and determining the values of coefficients of the binary mask blocking the code measurements and the phase measurements of the outlier satellite signals.

4. The method of claim 3, further comprising:

removing the outlier code measurements from the plurality of measurement models.

5. The method of claim 3, further comprising:

associating the outlier code measurements with measurement noise larger than measurement noise of nonoutlier code measurements, resulting in the same number of measurements being used in each measurement model, but different noise statistics associated with each measurement.

6. The method of claim 3, further comprising:

transitioning between the plurality of measurement models based on transition probabilities that are constant or determined as a function of one or a combination of signal-to-noise ratio of the GNSS measurement data, elevation angles of the satellites, and world geometries.

7. The method of claim 1, wherein the first measurement model of the first estimator includes a parametric covariance noise matrix with elements defining noise of the code measurements or differenced residuals of code measurements from multiple satellites, further comprising:

updating different elements of the noise covariance matrix based on a difference between a prediction of a state estimate by a prediction model of the first estimator and a measurement of the state estimate indicated by the measurement model processing the corresponding code measurements; and determining the values of the coefficients of the binary mask based on estimated parameters of the noise covariance matrix.

8. The method of claim 7, further comprising:

designating each of the satellite signals as being subject to outlier measurements based on an indicator function defined with the parameters of noise covariance matrix; and setting the values of the coefficients of the binary mask corresponding to each outlier satellite signal to zero based on indicator signals.

9. The method of claim 7, further comprising for each time step:

predicting a state estimate of the device using the prediction model subject to process noise; and iteratively updating, until a termination condition is met, the predicted state estimate and noise covariance matrix based on the first measurement model processing the code measurements of the satellite signals, wherein for each iteration, the first estimator updates the predicted state estimate and updates the noise covariance matrix with respect to the updated prediction of the position estimate.

10. The method of claim 9, further comprising:

iteratively updating parameters of an inverse Wishart or inverse gamma distribution over the noise covariance matrix and its elements.

11. The method of claim 10, further comprising:

designating each of the satellite signals as being subject to outlier measurements based on an indicator function defined as a threshold on statistical mean, statistical mode, or statistical quantile functions of the estimated inverse Wishart or the inverse gamma distribution over the noise covariance matrix.

12. The method of claim 9, wherein the noise covariance matrix is a joint covariance noise matrix of the GNSS measurements of the satellite signals updated by solving to a variational inference problem.

13. The method of claim 1, wherein the probabilistic estimators include one or a combination of a probabilistic filter and a probabilistic smoother.

14. The method of claim 13, wherein the probabilistic filter includes an approximate Gaussian filter using statistical linearization techniques to resolve nonlinearities of the estimation model.

15. The method of claim 1, wherein the first estimator tracks the state of the device, and wherein the second estimator jointly tracks state of multiple devices including the device, and a larger estimation problem is formed to jointly estimate the state trajectories of multiple receivers.

16. The method of claim 1, wherein the measurement model included in the first estimator describes a set of measurements that are a subset of the measurements used in the second estimator.

17. The method of claim 1, wherein the device is a GNSS receiver mounted to an aquatic buoy, further comprising:

determining changes of water level based on the state of the device.

18. A system for tracking a state of a device based on transmissions from a global navigation satellite system (GNSS), the system comprising a processor coupled with stored instructions, wherein the stored instructions, when executed by the processor cause the system to:

collect GNSS measurement data of satellite signals transmitted from multiple satellites, wherein the GNSS measurement data include code measurements, carrier phase measurements, and doppler measurements of the satellite signals;

execute multiple probabilistic estimators concurrently tracking the position state of the object device using different measurement models connecting the GNSS measurement data with the state of the device, wherein the multiple probabilistic estimators include a first estimator tracking the position state of the object device based on a first measurement model using the code measurements, and wherein the multiple probabilistic estimators include a second estimator tracking the state of the device based on a second measurement model using the GNSS measurement data masked by a binary mask blocking a subset of the GNSS measurement data formed in a subset of the satellite signals based on values of coefficients of the binary mask, wherein the first measurement model is smaller than the second measurement model;

determine the values of coefficients of the binary mask based on outputs of the first estimator;

determine the state of the device based on outputs of the second estimator;

output the state of the device determined by the second estimator, wherein the device is a GNSS receiver of a vehicle, such that the state of the device indicates a state of the vehicle; and control movement of the vehicle based on the state of the vehicle.

19. A non-transitory computer-readable storage medium embodied thereon a program executable by a processor for performing a method for estimating movement of a device based on a state of the device tracked using transmissions from a global navigation satellite system (GNSS), the method comprising: collecting GNSS measurement data of satellite signals transmitted from multiple satellites, wherein the GNSS measurement data code measurements, and carrier phase measurements of the satellite signals;

executing multiple probabilistic estimators concurrently tracking the position state of the object device using different measurement models connecting the GNSS measurement data with the state of the device, wherein the multiple probabilistic estimators include a first estimator tracking the position state of the object device based on a first measurement model using the code measurements, and wherein the multiple probabilistic estimators include a second estimator tracking the state of the device based on a second measurement model using the GNSS measurement data masked by a binary mask blocking a subset of the GNSS measurement data formed in a subset of the satellite signals based on values of coefficients of the binary mask, wherein the first measurement model is smaller than the second measurement model;

determining the values of coefficients of the binary mask based on outputs of the first estimator;

determining the state of the device based on outputs of the second estimator;

outputting the state of the device determined by the second estimator, wherein the device is a GNSS receiver of a vehicle, such that the state of the device indicates a state of the vehicle; and controlling movement of the vehicle based on the state of the vehicle.

* * * * *